(12) United States Patent
Gang

(10) Patent No.: US 9,563,708 B2
(45) Date of Patent: Feb. 7, 2017

(54) MATCHING MEMBERS WITH SHARED INTERESTS

(75) Inventor: David Gang, Oakton, VA (US)

(73) Assignee: AOL Inc., Dulles, VA (US)

( * ) Notice: Subject to any disclaimer, the term of this patent is extended or adjusted under 35 U.S.C. 154(b) by 2199 days.

(21) Appl. No.: 10/703,662

(22) Filed: Nov. 10, 2003

(65) Prior Publication Data

US 2005/0055450 A1 Mar. 10, 2005

Related U.S. Application Data

(63) Continuation-in-part of application No. 10/330,540, filed on Dec. 30, 2002, now abandoned.

(60) Provisional application No. 60/488,397, filed on Jul. 21, 2003, provisional application No. 60/426,819, filed on Nov. 18, 2002.

(51) Int. Cl.
*G06F 15/16* (2006.01)
*G06F 17/30* (2006.01)

(52) U.S. Cl.
CPC .............................. *G06F 17/30867* (2013.01)

(58) Field of Classification Search
CPC ................................................. G06F 17/30867
USPC ......................................................... 709/206
See application file for complete search history.

(56) References Cited

U.S. PATENT DOCUMENTS

| 5,796,395 | A | | 8/1998 | de Hond |
|---|---|---|---|---|
| 5,963,951 | A | | 10/1999 | Collins |
| 6,041,311 | A | * | 3/2000 | Chislenko et al. ............. 705/27 |
| 6,205,472 | B1 | * | 3/2001 | Gilmour ................... G06N 5/00 |
| | | | | 707/999.006 |
| 6,249,282 | B1 | | 6/2001 | Sutcliffe et al. |
| 6,400,381 | B1 | | 6/2002 | Barrett et al. |
| 6,434,599 | B1 | | 8/2002 | Porter |
| 6,480,885 | B1 | * | 11/2002 | Olivier .......................... 709/207 |
| 6,559,863 | B1 | | 5/2003 | Megiddo |

(Continued)

FOREIGN PATENT DOCUMENTS

| WO | WO02/062039 | 8/2002 |
|---|---|---|
| WO | WO 2004/028178 | 4/2004 |

OTHER PUBLICATIONS

BuddyGopher~About, available on Jul. 13, 2004, reprinted from http://web.archive.org/web/20040713002836/www.buddygopher.com/about.html on Sep. 8, 2006 (4 pages).

(Continued)

*Primary Examiner* — John Macilwinen
(74) *Attorney, Agent, or Firm* — Finnegan, Henderson, Farabow, Garrett & Dunner, LLP

(57) ABSTRACT

A "buddy member match" feature is directed to matching computer users of like interests, particularly computer users who are members of an online service provider. In general, a member (the match recipient) may update or create a member profile maintained by a service provider such as AOL. Once the match recipient has a member profile, a search is initiated to identify matching members by comparing the member profile of the match recipient to the member profiles of other members. Matching members are other members whose member profiles have at least one personal attribute matching an attribute of the match recipient's member profile. When contact information of the matching member is displayed, the contact information is accompanied by an indication that the contact information belongs to a matching member.

31 Claims, 26 Drawing Sheets

(56) References Cited

U.S. PATENT DOCUMENTS

| | | | |
|---|---|---|---|
| 6,571,234 B1* | 5/2003 | Knight et al. | 707/3 |
| 6,950,861 B1* | 9/2005 | Amro et al. | 709/219 |
| 7,035,865 B2* | 4/2006 | Doss et al. | 707/102 |
| 7,068,309 B2* | 6/2006 | Toyama et al. | 348/231.5 |
| 7,099,862 B2* | 8/2006 | Fitzpatrick et al. | 707/3 |
| 7,827,055 B1* | 11/2010 | Snodgrass | G06Q 30/02 705/14.73 |
| 2002/0059201 A1* | 5/2002 | Work | 707/3 |
| 2002/0087620 A1* | 7/2002 | Rouse et al. | 709/203 |
| 2002/0178163 A1* | 11/2002 | Mayer | 707/10 |
| 2003/0009523 A1 | 1/2003 | Lindskog et al. | |
| 2003/0084103 A1* | 5/2003 | Weiner et al. | 709/205 |
| 2003/0167324 A1* | 9/2003 | Farnham et al. | 709/224 |
| 2004/0017396 A1* | 1/2004 | Werndorfer et al. | 345/751 |
| 2004/0260762 A1 | 12/2004 | Fish | |
| 2005/0038856 A1 | 2/2005 | Krishnasamy et al. | |
| 2005/0060377 A1 | 3/2005 | Lo et al. | |
| 2013/0124629 A1* | 5/2013 | Appelman | H04L 12/581 709/204 |

OTHER PUBLICATIONS

BuddyGopher~We Love Away Messages!, "BuddyGopher simultaneously checks the away messages of your favorite AIM® buddies.", available on Sep. 24, 2004, reprinted from http://web.archive.org/web/20040924104001/http://www.buddygopher.com/ on Sep. 8, 2006 (2 pgs).

Dodgeball.com:: mobile social software, "Hook up with friends. Discover what's around you.", available on Nov. 30, 2004, reprinted from http://web.archive.org/web/20041130034344/www.dodgeball.com/social/index.php on Sep. 8, 2006 (2 pgs).

Dodgeball.com:: mobile social software, "help: the basics", available on Oct. 9, 2004, reprinted from http://web.archive.org/web/20041009200739/www.dodgeball.com/social/help_basics.php on Sep. 8, 2006 (2 pgs).

Dodgeball.com:: mobile social software, "help: text messaging", available on Oct. 13, 2004, reprinted from http://web.archive.org/web/20041013034241/www.dodgeball.com/social/help_text.php on Sep. 8, 2006 (2 pgs).

Dodgeball.com:: mobile social software, "help: use it", available on Oct. 9, 2004, reprinted from http://web.archive.org/web/20041009201853/www.dodgeball.com/social/help_useit.php on Sep. 8, 2006 (1 pgs).

International Search Report, Application Serial No. PCT/US2006/018286, dated Oct. 19, 2006, 12 pages.

Jensen et al., "Finding Others Online: Reputation Systems for Social Online Spaces", Proceeding fo the SIGGHI Conference on Human Factors Computing Systems: Changingn your world, changing ourselves, vol. 4, No. 1, Apr. 2002, pp. 447-454.

Yoshino et al., "NAMBA: Location-Aware Collaboration System for Shopping and Meeting", IEEE Transactions on Consumer Electronics, vol. 48, No. 3, Aug. 2002, pp. 470-477.

Ranganathan et al., "ConChat: A Context-Aware Chat Program", Pervasive Computing, IEEE, vol. 1, Issue 3, Jul.-Sep. 2002, pp. 51-57.

Notification of Transmittal of the International Search Report, International Application No. PCT/US03/36793, dated Apr. 22, 2004, 30 pages.

* cited by examiner

600

To edit your profile, modify the category you would like to change and select "Update."

Your Name: _____ 602

City, State, Country: _____ 604

Sex: ○ Male  ○ Female  ◉ No Response  ← 606

Marital Status: _____ 608

Hobbies: ☐ Do not invite me to Buddy Chats with members who share my interests. _____ 610
618

Computers Used: _____ 612

Occupation: _____ 614

Personal Quote: _____ 616

[ Update ]   [ Delete ]   [ Cancel ]

Figure 6

MATCHING MEMBERS WITH SHARED INTERESTS

CROSS-REFERENCE TO RELATED APPLICATIONS

This application is a continuation-in-part application of and claims priority to U.S. application Ser. No. 10/330,540, filed on Dec. 30, 2002 now abandoned. This application also claims priority under 35 USC §19(e) to U.S. Provisional Patent Application Ser. No. 60/488,397, filed on Jul. 21, 2003, and U.S. Provisional Patent Application Ser. No. 60/426,819, filed on Nov. 18, 2002, the entire contents of which are hereby incorporated by reference.

TECHNICAL FIELD

This description relates to online computer services.

BACKGROUND

Chat systems provide a way for online users to engage in real-time conversations. Typically, these systems provide for real-time group textual messaging, with the conversational groups defined by "chat rooms." Chat systems are normally implemented in a distributed computing environment.

Chat systems enable real-time communications on various topics by two or more participants of similar or divergent interests or backgrounds. Typically, chat participants review chat room attributes (e.g., title) to identify chat rooms that may have other participants who share their interest and, consequently, will provide interesting conversations.

Chat systems may be part of a larger suite of communication services provided by an online service provider. For example, America Online® (AOL) provides its members with a number of online communication services, such as instant messaging (IM), e-mail, and message boards, some of which have particular and peculiar nuances, requirements, and features distinct from chat systems.

SUMMARY

A system includes a "buddy match" feature for identifying one or more matching members for a match recipient. Identifying one or more matching members includes maintaining a member profile for the match recipient, where the member profile includes at least one personal attribute. The match recipient's member profile is compared to other member profiles to identify at least one matching member. A matching member is a user whose member profile has at least one attribute matching an attribute of the match recipient's member profile. Contact information for the matching member is displayed to the match recipient in a user interface for an online communication service and the displayed contact information is accompanied by an indication that the displayed contact information belongs to a matching member.

Implementations may include one or more of the following. For example, the contact information may include a screen name. The screen name can be displayed, e.g., in a buddy list of an instant messaging client or in a post on a message board. The indication may include a colored highlight displayed behind the matching member's screen name.

The contact information may be an e-mail address. The e-mail address for the matching member may be displayed, e.g., in an e-mail mailbox of the match recipient or in an e-mail header displayed to the match recipient. The indication may include a colored highlight displayed behind the matching member's e-mail address.

The personal attribute may include hobbies.

Intermediary members can be identified. An intermediary member is a user that connects the match recipient to the matching member. The contact information for the intermediary member can be displayed to the match recipient along with an indication that the contact information belongs to an intermediary member.

Identifying an intermediary member may include identifying a user whose contact information is in a contact list of the match recipient; determining whether contact information of the matching member is in a contact list of the user whose contact information is in a contact list of the match recipient; and designating the user as an intermediary member when the matching member's contact information is in a contact list of the user.

Implementations of the techniques discussed herein may include hardware, a method or process, or computer software on a computer-accessible medium. The details of one or more implementations are set forth in the accompanying drawings and the description below. Other features will be apparent from the description and drawings, and from the claims.

DESCRIPTION OF DRAWINGS

FIGS. 4-10 are screen-displays corresponding to steps of the process of FIGS. 3A and 3B.

DETAILED DESCRIPTION

Figure 1:
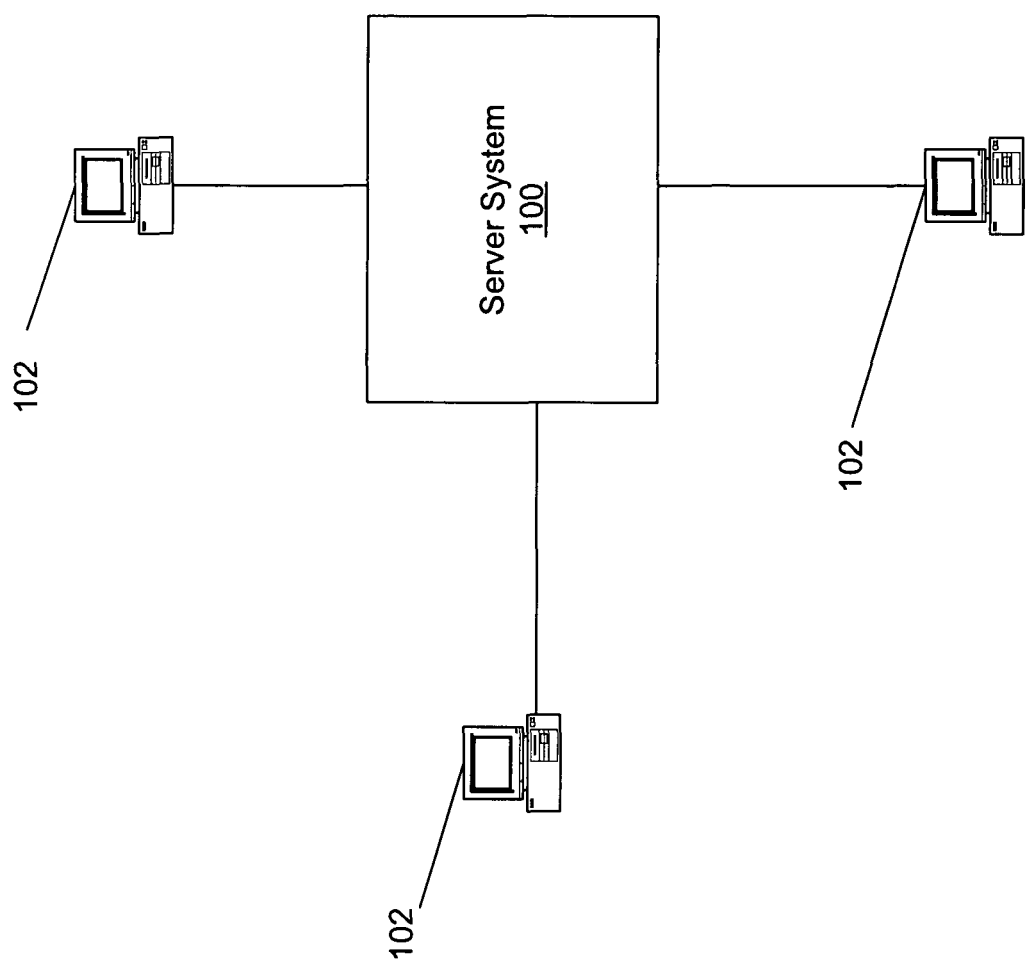
FIG. 1 is a block diagram of a distributed computing environment supporting a chat room service.

A chat system may include a "match chat" feature that identifies potential chat participants who share attributes and/or interests with a user who wants to participate in a chat session. In one general aspect, identifying one or more potential chat participants for a first user of a chat room system includes maintaining a member profile including at least one personal attribute for the first user. The first user's member profile is compared to other member profiles to identify potential chat participants. Potential chat participants are other users of the chat room system whose member profiles have at least one attribute matching an attribute of the first user's member profile. The first user is sent an indication that potential chat participants have been identified.

A "buddy member match" feature may be directed more to matching computer users of like interests, particularly computer users who are members of an online service provider. In general, a member (the match recipient) may update or create a member profile maintained by a service provider such as AOL. Once the match recipient has a member profile, a search is initiated to identify matching members by comparing the member profile of the match recipient to the member profiles of other members. Matching members are other members whose member profiles have at least one personal attribute matching an attribute of the match recipient's member profile. Then, the match recipient is provided with an indication of matching members as the match recipient uses various communication services provided by the service provider and encounters screen names, e-mail address, or other contact information of matching members. To do so, when the contact information is displayed in the user interface for the communication service, the contact information is accompanied by an indication that the contact information belongs to a matching member.

Match recipients and matching members may be matched according to a number of different attributes. For example, the member profiles may contain attributes, such as, for example, hobbies, occupation, gender, marital status, and location. These attributes then may be compared to determine whether a match occurs.

The buddy match feature may further have a "connected match" feature. In the connected match feature, intermediary members are also identified. Intermediary members are those members who have a personal, business or other relationship with both the match recipient and the matching member. To determine whether a member is an intermediary member, one or more contact lists of the match recipient, intermediary member, and/or the matching member may be examined. For example, a contact list of the match recipient may be examined to determine a potential intermediary member. A contact list of the matching member then may be examined to determine if the potential intermediary member is on the matching member's contact list. If so, the potential intermediary member is designated as an intermediary member.

Once intermediary members are identified, the match recipient is provided with an indication of intermediary members as the match recipient uses various communication services provided by the service provider and encounters screen names, e-mail address, or other contact information of intermediary members. When intermediary matches are indicated, the match recipient also may be provided with an indication of the matching member the match recipient is linked to by the intermediary member. Identifying intermediary members may be particularly useful when no relationship exists between a match recipient and matching member because the intermediary may be able to facilitate an initial contact between the match recipient and matching member.

FIG. 1 is a block diagram of a distributed computing environment that supports communication services, such as chat services, IM services, e-mail services, and message board services. In this implementation, users are distributed geographically and communicate with a server system 100 using client systems 102. In practice, server system 100 may include interconnected server computers that are physically dispersed, rather than a single physical entity. Each server computer may be dedicated to a particular function and/or a particular geographical region. Each client system 102 runs client communication software that communicates with corresponding server software on server 100. Client systems 102 communicate with server 100 through communication mediums that may include, for example, a modem connected to a telephone line (using, for example, SLIP or PPP) or a direct internetwork connection (using, for example, TCP/IP). Server system 100 coordinates communications by receiving the textual, or other, input sent from client systems 102 and replicating that input to other appropriate client systems 102.

Figure 2:
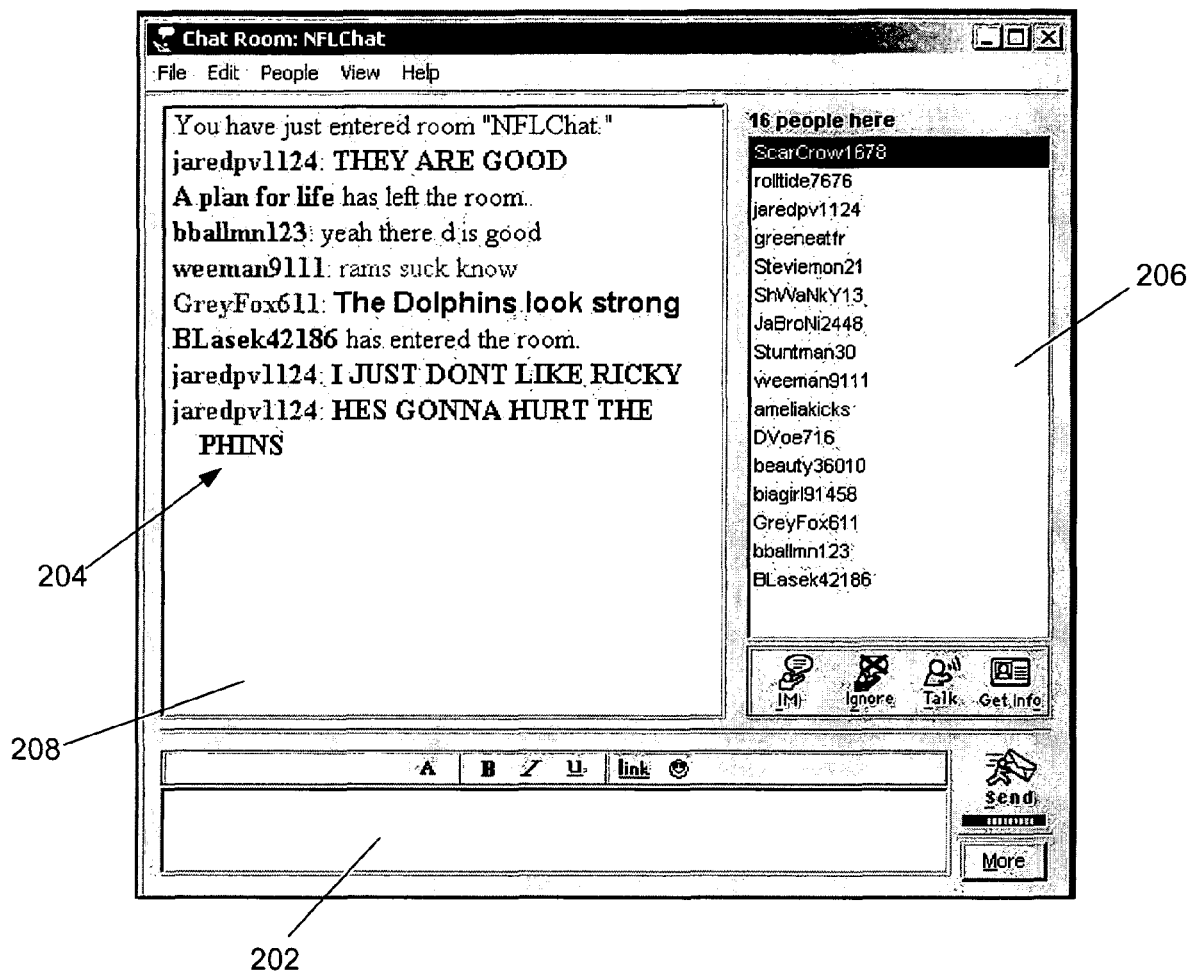
FIG. 2 illustrates a screen-shot of a typical chat room, as it would appear on a client system.

FIG. 2 illustrates a screen display 200 of a typical chat room, as it would appear on a client system 102. Generally, to be a part of a conversational group, a user joins a chat room. Server system 100 then replicates the messages sent to the chat room by the user to other users who have joined the chat room. The exemplary chat room of FIG. 2 has sixteen participants whose screen names are listed in window 206. Their conversation 204 is displayed in scrolling window 208, which normally appears the same for all participants. A participant converses with other participants by typing a line of text in edit box 202 and activating a send command, for example, by pressing the ENTER key of the keyboard of the participant's client system 102. In response, the entered text is displayed at the bottom of window 208. All participants in the chat room can now see the entered text.

Figure 3A:
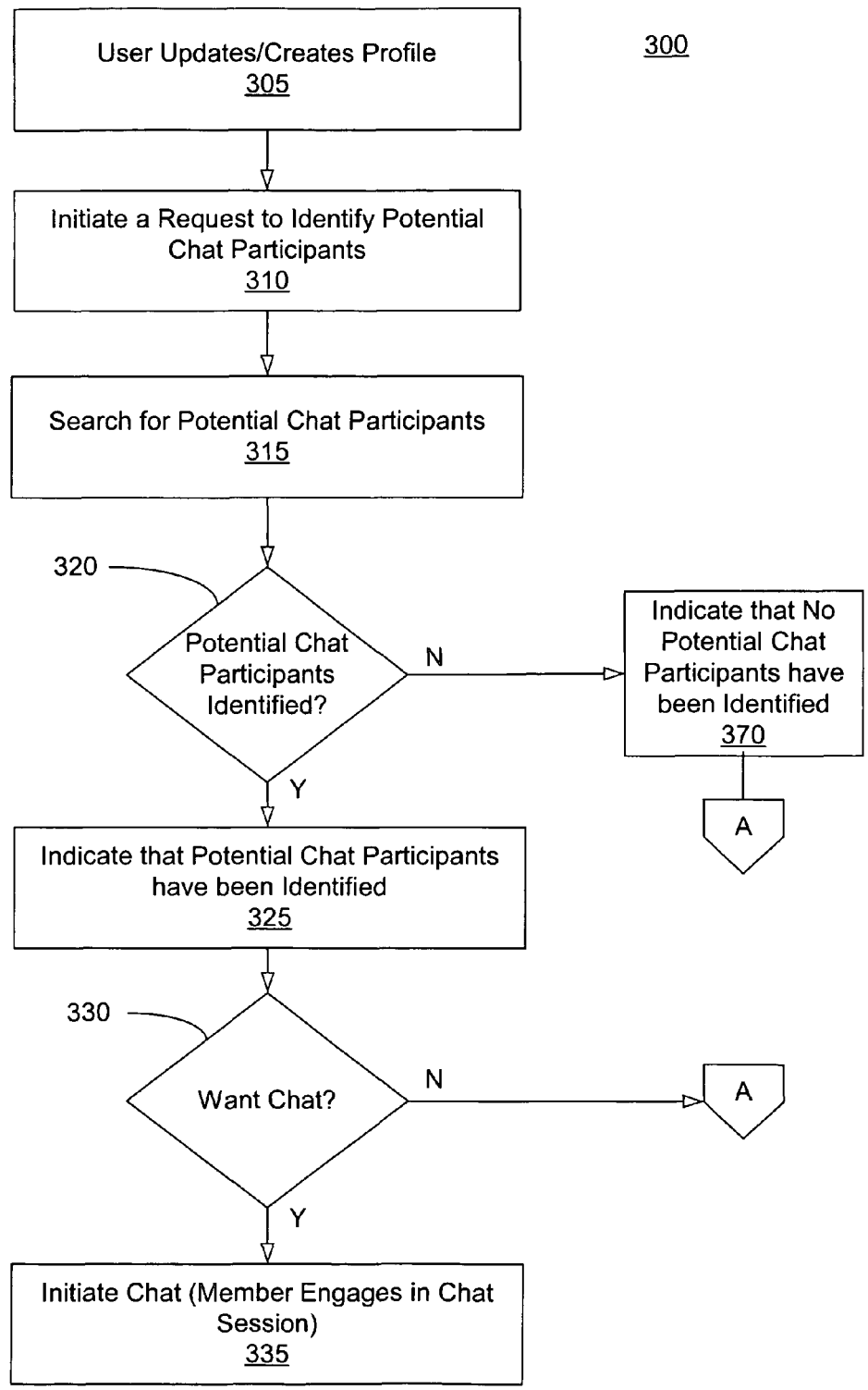
FIGS. 3A and 3B are a flow chart of a process for implementing a match chat feature.
Figure 3B:
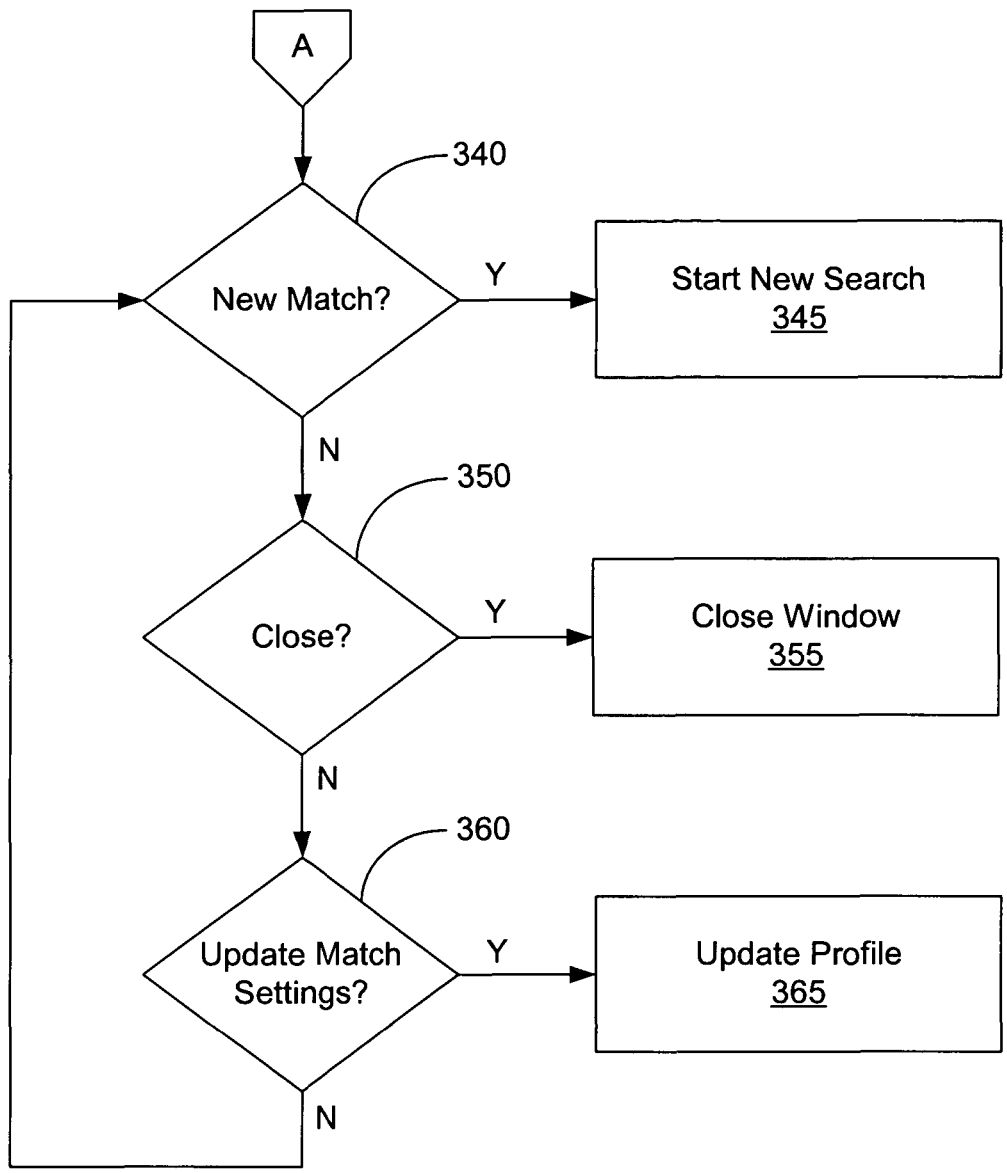

A match chat feature enables identification of potential chat participants who share attributes and/or interests with a first user. FIGS. 3A and 3B illustrate a flow chart of a procedure 300 for implementing the match chat feature. FIGS. 3A and 3B will be discussed in conjunction with FIGS. 4-10, which illustrate exemplary screen-displays for various steps of the procedure 300.

Generally, in one implementation, a chat server has a membership profile database and a chat front-end to implement the various techniques and procedures for providing the match chat feature. The membership profile database performs the search functions and notifies the chat front-end when potential chat participants have been identified and what attributes and/or interests have matched. The front-end uses this information to generate the displays presented to the user. The front-end also receives input from the user through displays and sends messages and information to the membership profile database as needed. For instance, when a user enters a profile using a display provided by the front-end, the front end forwards the profile to the membership profile database for storage. Also, for example, when a user initiates a search, the front-end receives the request and sends a message to the membership profile database to initiate the search.

Figure 4:
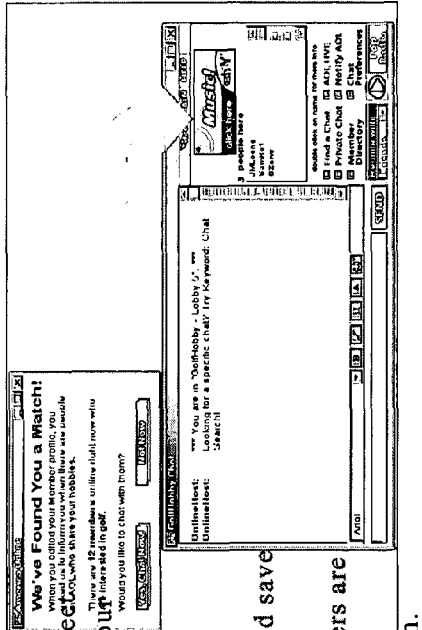

Displays, such as those shown in FIGS. 4 and 5A-5C, give users details concerning the match chat feature of the chat system, and the ability to modify or create their member profiles for the feature. As shown in FIG. 4, a display 400 has graphics and text 402 that explain to a user how the match chat feature works. The display 400 also provides a "try it" button 404 that opens a member profile display. The member profile display allows a member to create or modify his or her profile. In alternate implementations, display 400 may have a match now button and a separate link to the member profile display, rather than a try-it button. The user can use the link to open the member profile display to create or edit the user's profile. When a user actuates the match now button, a determination is made as to whether the user has a member profile that has an entry for the particular attribute to be matched (e.g., hobbies). If not, the member profile display is presented, and the user is prompted to create the profile or update the attribute to be matched. If the user has a profile that contains an entry for the attribute to be searched, a search is initiated. Display 400 also has a "step-by-step" button 406 that takes a user to a step-by-step display, such as the one illustrated in FIGS. 5A-5C.

Generally, step-by-step display 500 provides more detailed information about the match chat feature. It has three numbered buttons 502, 504, and 506 that can be clicked, one at a time. Each click results in the display of a short piece of text and an illustration 508 of the feature that elaborates on the text. When clicked, buttons 502, 504, and 505 are highlighted and illustration 508 changes.

Figure 5A:
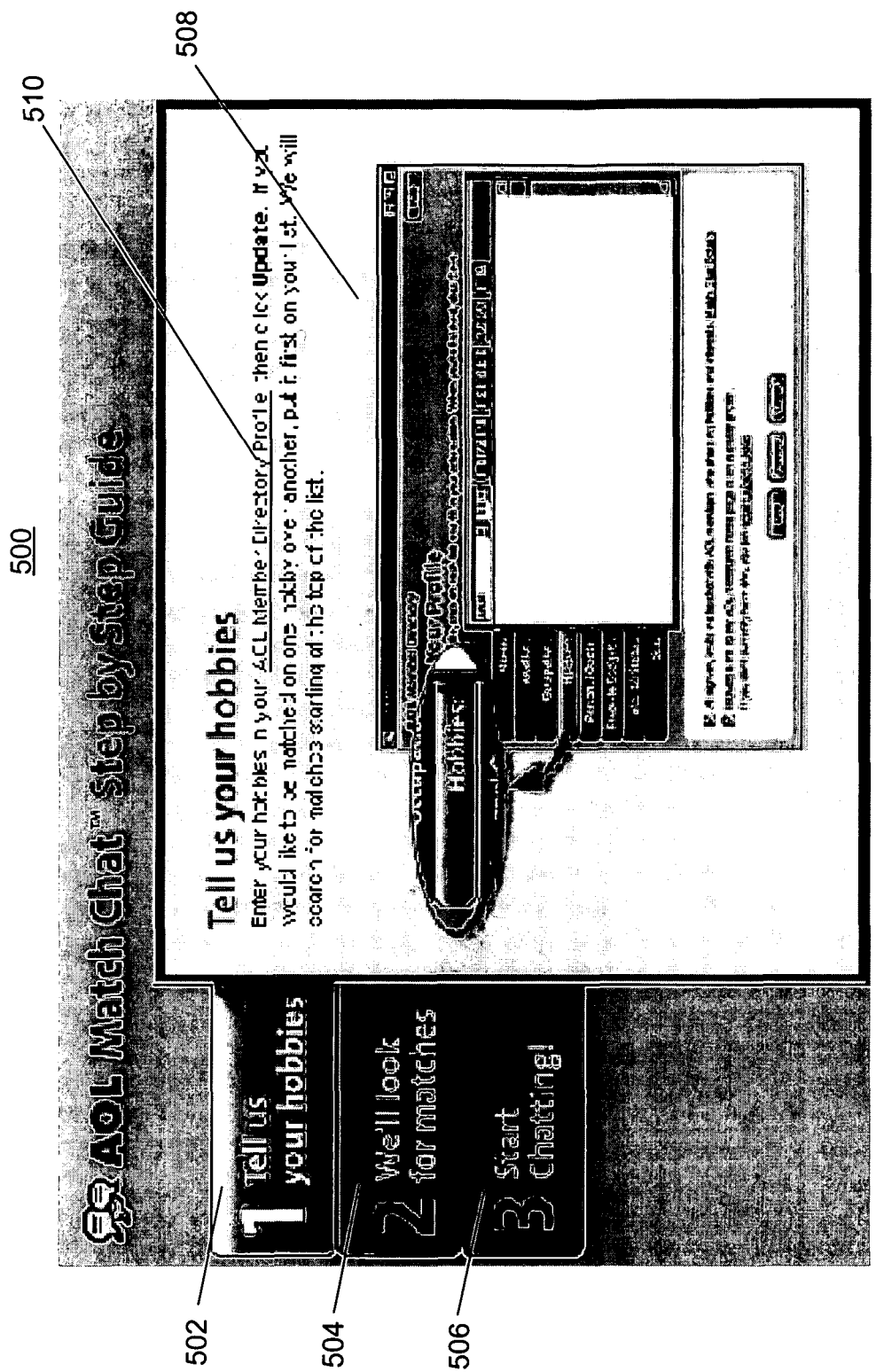
Figure 5B:
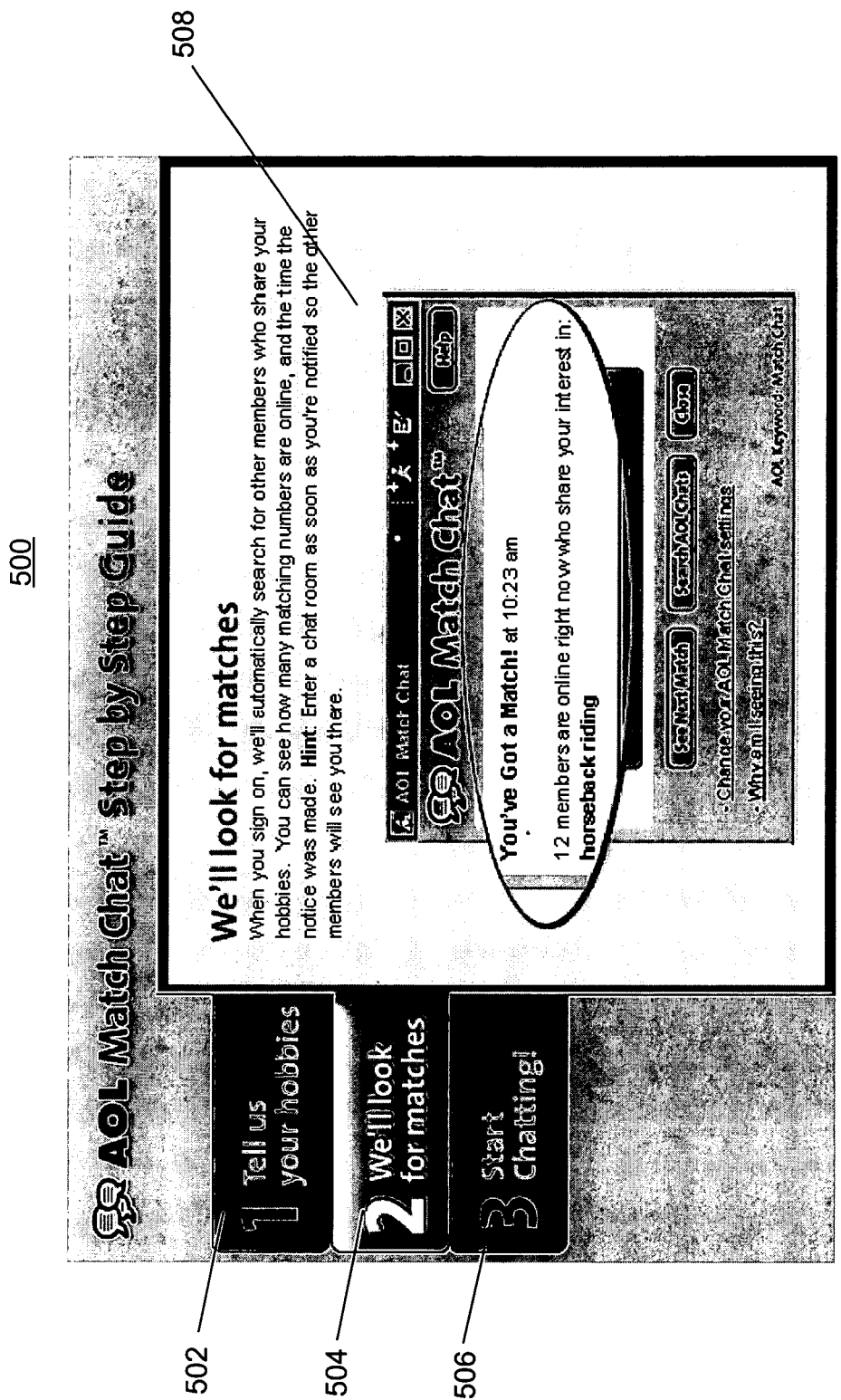
Figure 5C:
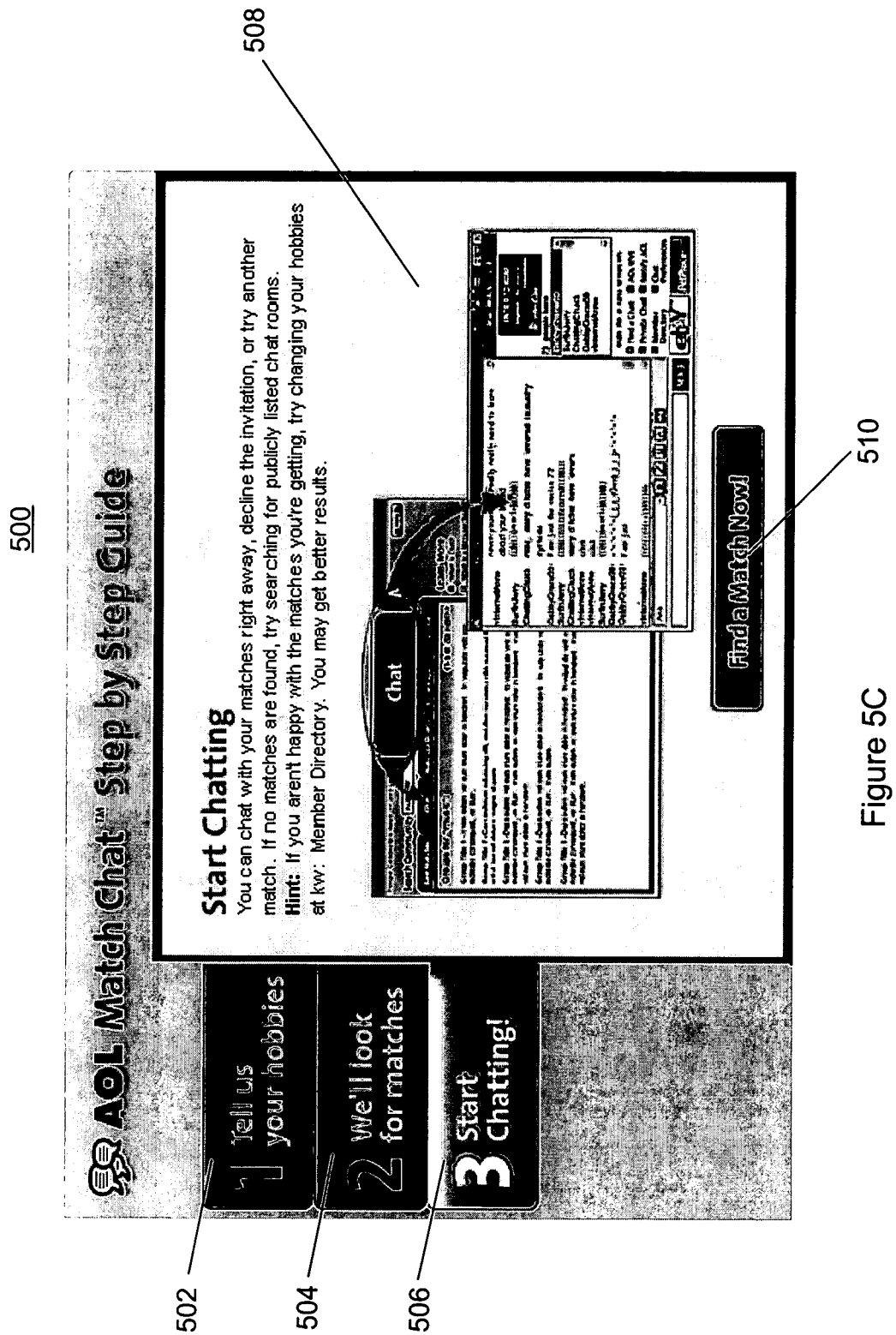

FIGS. 5A-5C show one implementation of step-by-step display 500 for the case when hobbies are matched. As shown in FIG. 5A, button 502 (number 1) has the text "Tell us your hobbies" displayed on it. When button 502 is clicked, illustration 508 informs a user how to update hobbies in the user's member profile so that the hobbies can be matched with those of other users. Illustration 508 also provides a link 510 that takes a user to the member profile display.

Button 504 (number 2) has the text "We'll look for matches" displayed on it. When button 504 is clicked, illustration 508 changes to that shown in FIG. 5B. In FIG. 5B, illustration 508 informs a user that the user's hobbies will be used to search for other members with matching hobbies to determine potential chat participants. Illustration 508 also informs the user that a display will be shown when potential chat room participants are identified.

Referring to FIG. 5C, button 506 (number 3) has the text "Start Chatting!" displayed on it. When button 506 is clicked, illustration 508 changes to that shown in FIG. 5C. In FIG. 5C, illustration 508 informs the user that the user can start chatting with the potential chat participants found, can decline to chat, or can search for other matches. Illustration 508 also has a match now button 510, which functions as described above.

FIG. 6 illustrates an exemplary member profile display. Referring again to FIGS. 3A and 3B, member profile display 600 is used by a user of the chat system to create or update the user's member profile, which contains at least one personal attribute, such as, for example, hobbies, occupation, gender, and marital status (step 305). As shown, display 600 has areas for a user to enter or indicate his or her name 602, city, state, and country 604, gender 606, marital status 608, hobbies 610, occupation 614 or a personal quote 616. In one implementation, when a user creates or updates his or her profile, the user is automatically opted-in to the match chat feature, unless the user indicates a desire to opt-out. The user may do so by, for example, marking the check-box labeled "Do not invite me to Buddy Chats with members who share my interests" 618. In a distributed computing implementation, the profile is typically stored at server 100. However, this profile could be stored at client system 102 and transmitted to server 100 when needed.

Figure 7:
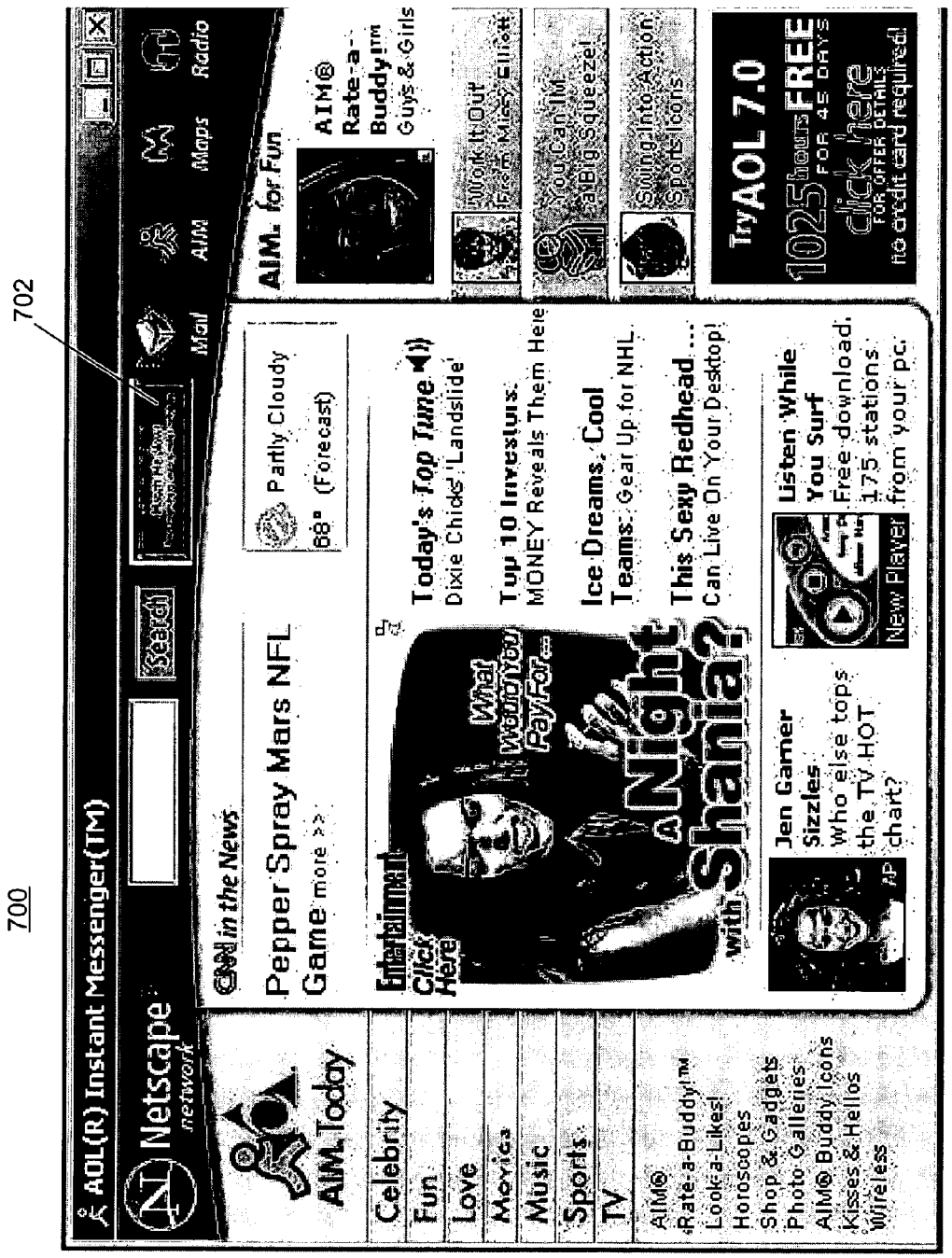

After a user has created or updated the profile, the user can initiate a request to identify potential chat participants (step 310). This request may be initiated manually by the user, for example, by pressing a "match chat" button that can appear in any display generated by the system. The match chat button operates in the same way as the match now button described above with regard to details display 400. FIG. 7 illustrates an exemplary screen 700 that contains a match chat button 702.

Alternatively, the request may be initiated automatically when the user signs on to the chat system. In one implementation, when a user signs on and has opted for the match chat feature, a determination is made as to whether the user has an entry in his or her member profile for the particular attribute to be matched (e.g., hobbies). If not, the member profile display is presented, and the user is prompted to update the attribute to be matched. If the profile contains an entry for the attribute to be searched, a search is initiated.

Once the request is initiated, the chat system begins to search for potential chat participants by comparing the member profile of the requesting user to the member profiles of other users (step 315). Potential chat participants are identified as those other users whose member profiles have at least one personal attribute matching an attribute of the requesting user's member profile. For example, if the requesting user has indicated golf as a hobby, potential chat participants are those that also have indicated golf as a hobby. To perform the search, all users who have been opted into the match chat feature are grouped together. The attributes of the requesting user are then compared to the attributes of each of the users grouped together. A match occurs when the attribute of one of the users in the group matches an attribute of the requesting user. In some implementations, the system can be limited so that only one attribute (e.g., hobbies) is compared for each member. In other implementations, more than one attribute can be compared. Other implementations may also support an attribute that includes more than one item. For example, a user's hobbies may include golf and skiing. To ensure that the potential participants identified are currently on-line, the search may be limited to users who have signed on or clicked the match chat button within a predetermined, immediately previous period of time (e.g., in the last 2 minutes).

The search continues for a predefined length of time, or until a predefined number of matches has been found, whichever occurs first. These items can be the same or different for the manual or automatic searches. For example, in one implementation, when the request is automatically initiated, the search continues for a maximum of the average session length (e.g., 60 minutes) or 12 matches, while, when the search is manually initiated, the search continues for a maximum of two minutes or 12 matches. These parameters may be configurable by the user or by a system administrator.

Figure 8:
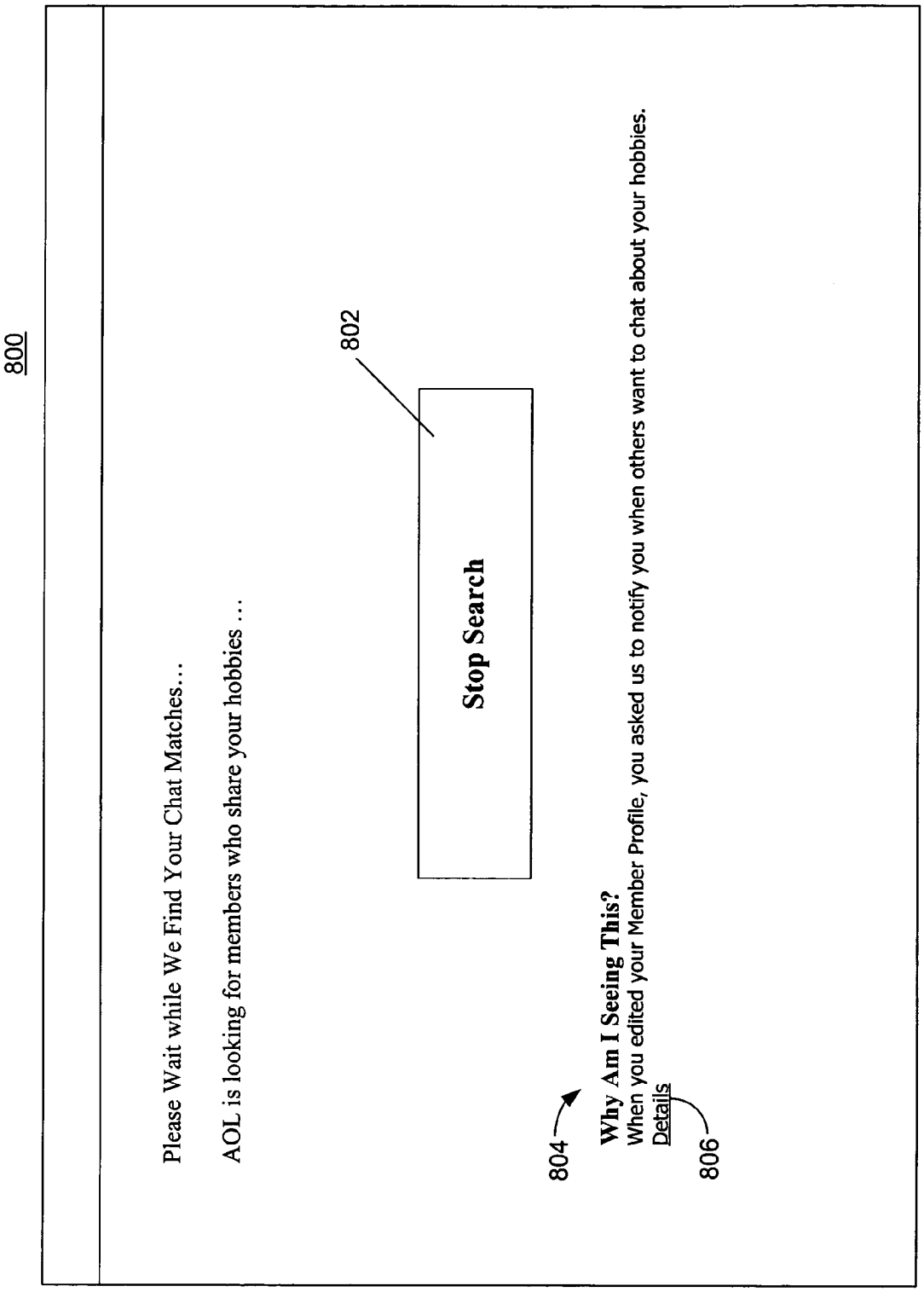

If the user manually initiated the search, a "please wait" display is displayed to the user during the search. An exemplary please-wait display 800 is illustrated in FIG. 8. As shown, display 800 indicates that a search is being performed, and gives the user the ability to stop the search using a "stop-search" button 802. Display 800 also provides an explanation 804 of why it is being shown, along with a link 806 to the details screen (as illustrated in FIG. 4) that describes the match chat feature. In other implementations, the please-wait display 800 can always be shown when a search is conducted, whether the search is initiated manually or automatically.

Figure 9:
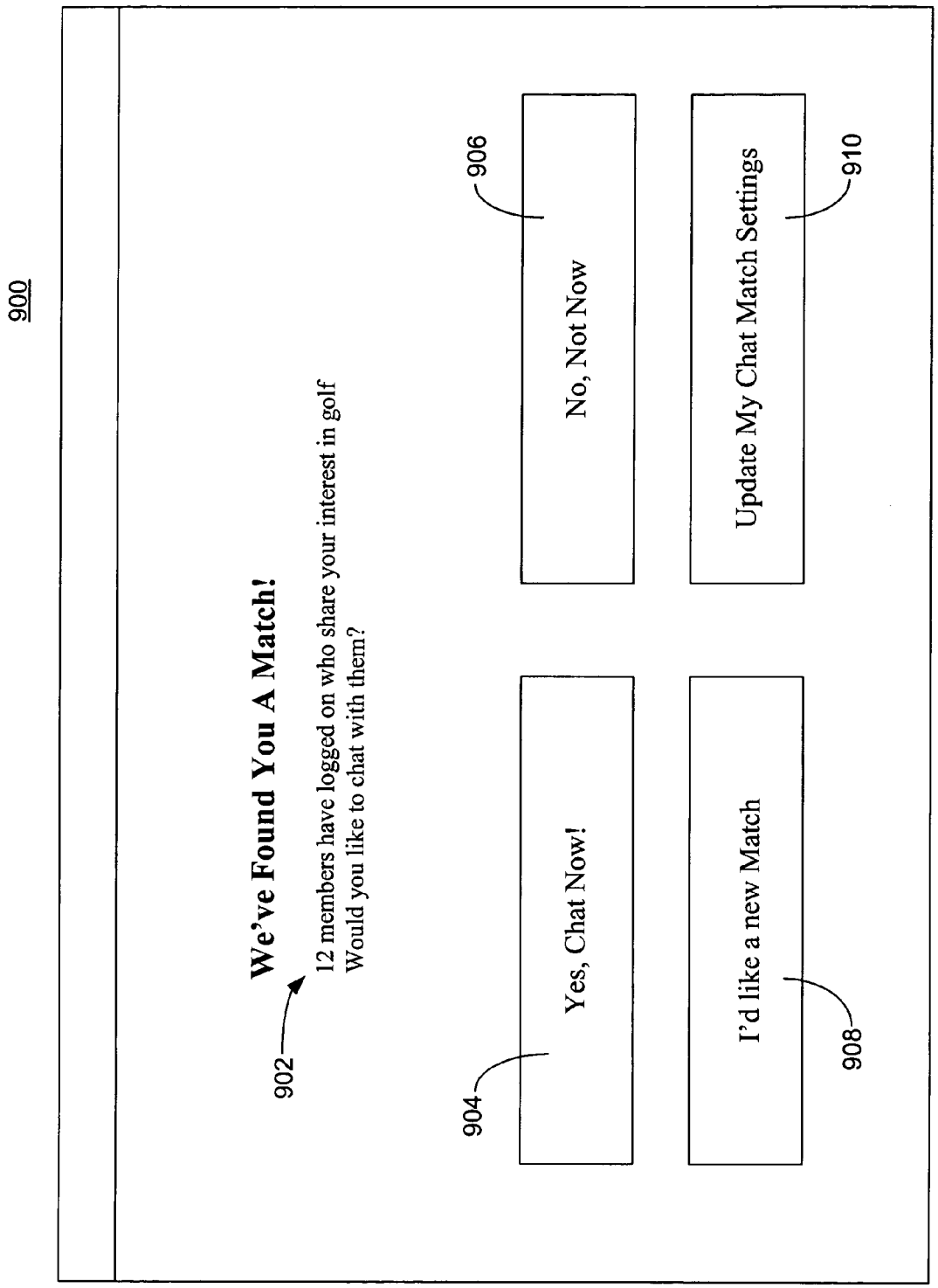

If potential chat participants are identified (step 320), this is indicated and a "matches-found" display is displayed (step 325). An exemplary matches-found display 900 is illustrated in FIG. 9. Display 900 indicates the number of potential chat participants and what attribute they match. In the exemplary display 900, 12 other users matched the user's interest in golf (golf was entered as a hobby). Display 900 also includes a "chat now" button 904 through which the user can cause a chat to be initiated with the potential chat participants. When the user presses button 904 to indicate that the user wants a chat (step 330), a chat room (such as the one illustrated in FIG. 2) is initiated, and the user and the potential chat participants are joined to the chat room (step 335). Whether the matches-found display 900 is displayed can also be made to depend on the number of potential chat participants found. For instance, it may be displayed only if three or more potential chat participants are identified. In this case, if fewer than three potential participants are identified, the process may continue as if potential chat participants have not been found (see below).

If the user does not wish to engage in a chat (step 330), display 900 allows the user other options. The user can select (step 340), using the "new match" button 908, to have a new search conducted (step 345). When a new match is initiated, the same attributes can be searched to try to match people who have just signed on or manually initiated a search, or different attributes can be searched to try to get different results based on a different attribute. Also, a different item of the requesting user's attribute can be searched to get different results. For example, skiing may be searched instead of golf. The user can also use (step 350) the "don't chat" button 906 to close display 900 and dismiss the search (step 355). Lastly, the user can use (step 360) the "update" button 910 to update the user's profile (step 316).

Figure 10:
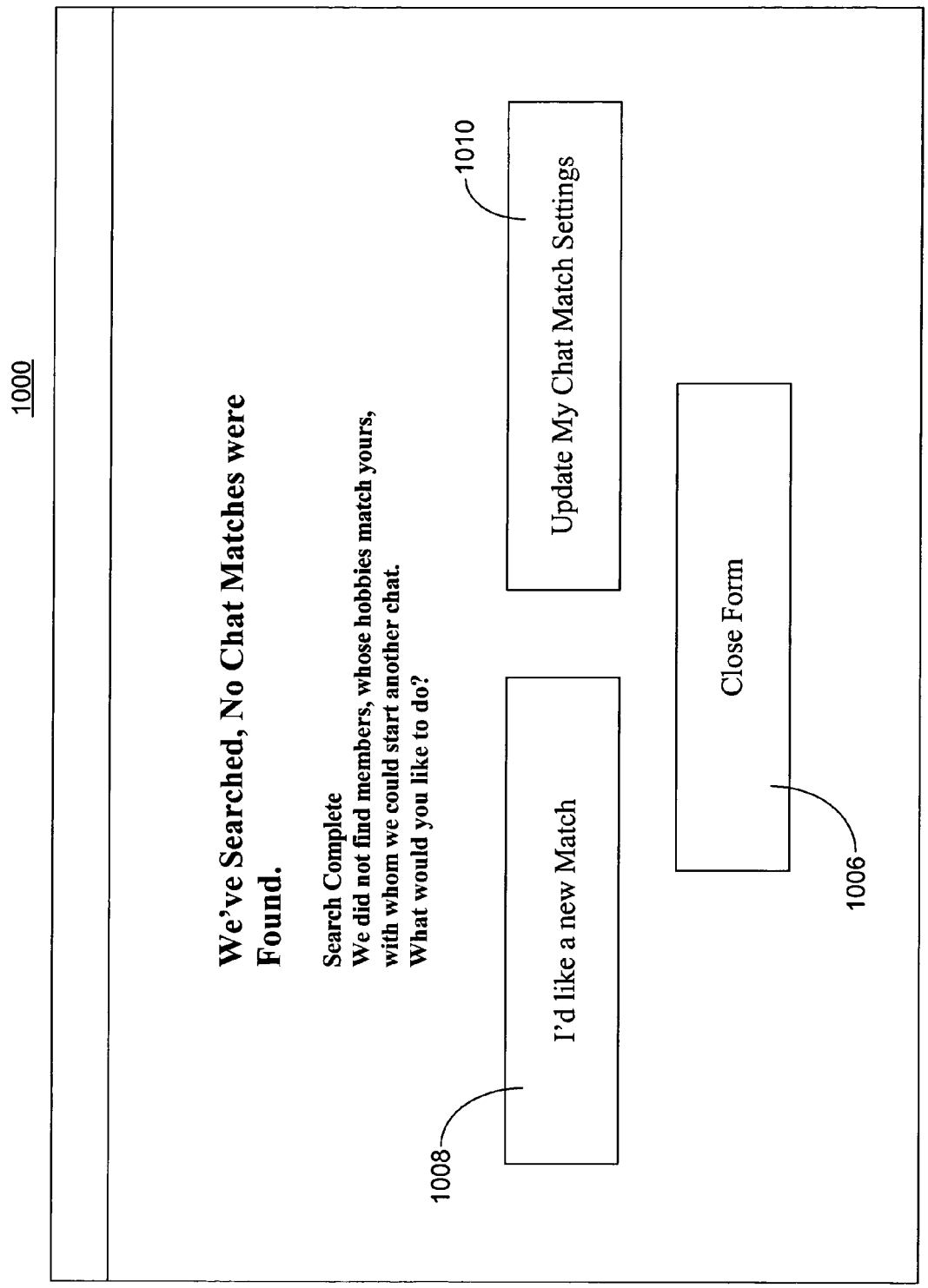

If potential chat participants cannot be identified (step 320), this is indicated and a "matches not found" display is displayed (step 370). An exemplary matches-not-found display 1000 is illustrated in FIG. 10. Display 1000 indicates that no potential chat participants were found for the attribute(s) searched. As with display 900, display 1000 allows the user to have a new search conducted (step 345) using the new match button 1008; close the screen 1000 (step 355) using the close form button 1006; or update his or her profile (step 316) using the update button 1010. Other implementations may allow the user to search chat room conversations performed for the attribute if no potential chat participants are identified. For example, a user can match all chat conversations for "golf" if no users have a hobby matching golf. One manner of allowing the user to perform this search of the chat rooms would be to provide a "chat search" button on the matches-not-found display 1000.

Figure 11:
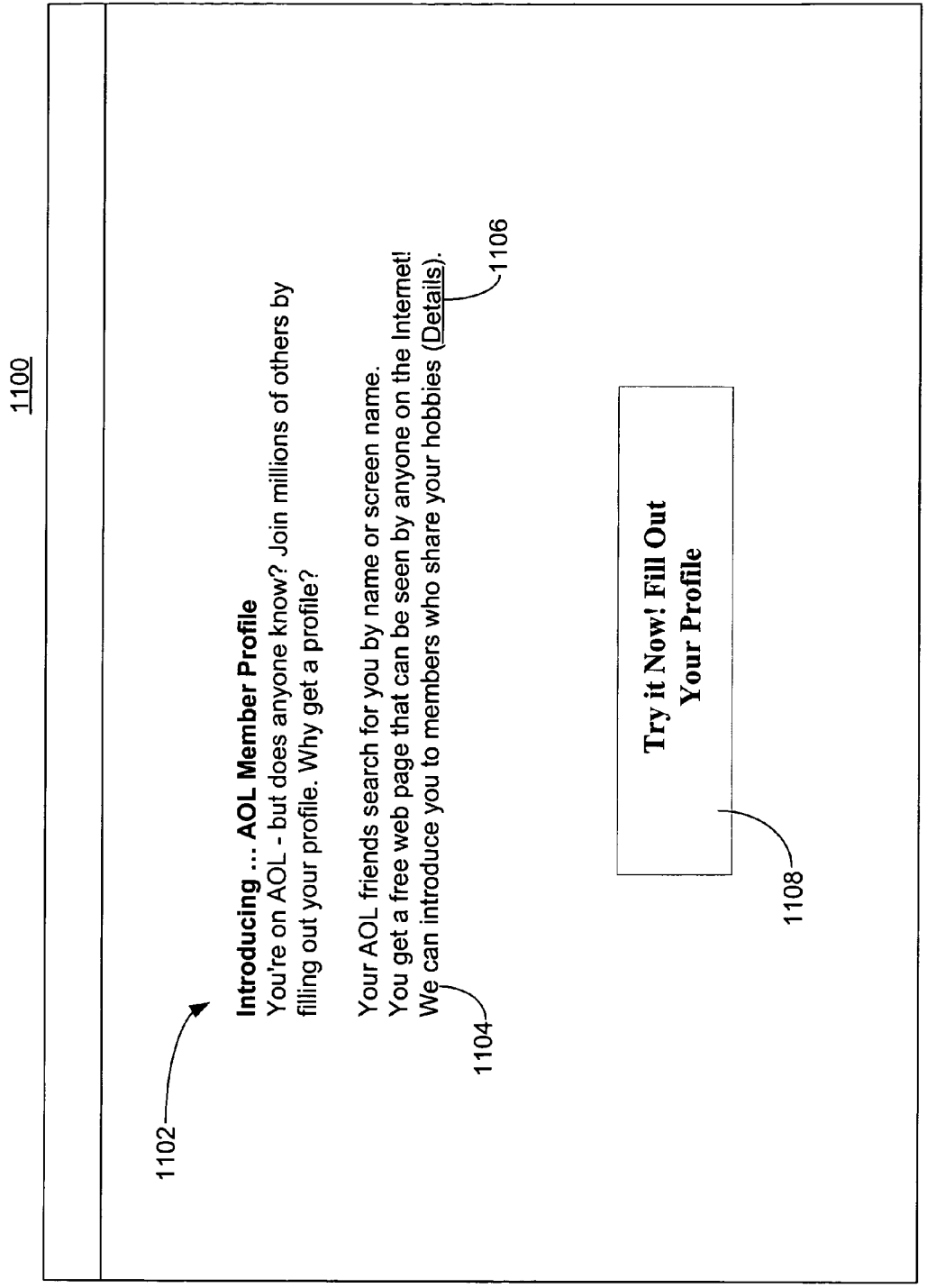
FIG. 11 is a screen-display of a promotion screen to encourage users to create profiles and to use the match chat feature.

Other implementations may encourage users to create profiles and use the match chat feature. Accordingly, a "promotion" display can be presented to those users, or at least to a percentage of those users who are not using the match chat feature, or who do not have profiles. An exemplary promotion display is illustrated in FIG. 11. Promotion display 1100 has text 1102 that describes the advantages of having a member profile. One of the advantages listed is the match chat feature 1104, which contains a link 1106 to the match chat details display illustrated in FIG. 4. Display 1100 also has a try-it button 1108 that opens the member profile window. Alternatively, when a user actuates the try-it now button 1108, a determination may be made as to whether the user has a member profile that has an entry for the particular attribute to be matched. If not, the member profile display is presented, and the user is prompted to create the profile or update the attribute to be matched. If the user has a profile that contains an entry for the attribute to be matched, a search is initiated.

In some implementations, the promotion display can allow the user to input attributes and/or interests for a one-time search. That is, instead of having to complete a member profile, the user can input attributes and/or interests into the promotional display and have a search conducted without generating a member profile.

Figure 12:
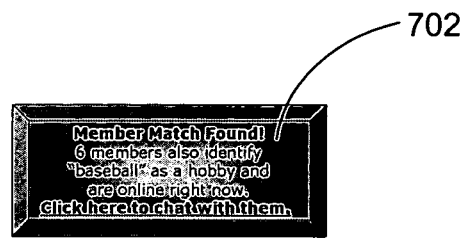
FIG. 12 illustrates a match chat button used to indicate that potential chat participants have been identified and to cause a chat to be initiated with the potential chat participants.

Also, the match chat button 702 can be used with, or replace, the matches-found display 900. In this case, the match chat button 702 indicates that matches have been found. Such a use of the match chat button 702 is illustrated in FIG. 12. As shown, the match chat button 702 has been modified to display the number of potential participants identified and the matching attribute. The match chat button 702 can then be used in the same way as the chat-now button 904 to initiate a chat with the potential participants. Match chat button 702 can also be used to promote the match chat feature if the user has opted-out of chat matching or if the user does not have a profile. In this case, it will open the member profile display when pressed.

Figure 13:
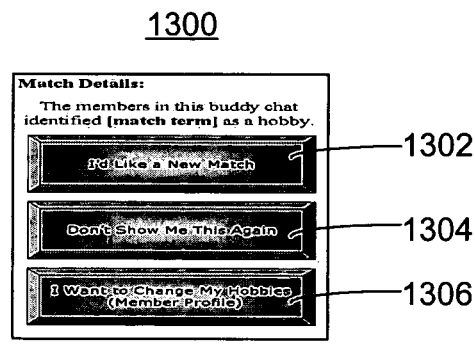
FIG. 13 illustrates a companion window for use when a user is participating in a chat room.

Another variation includes a smaller display that can be provided when a chat room is initiated. FIG. 13 illustrates an example of such a display 1300. Display 1300 provides information on the present chat room, and has a number of buttons that assist the user in performing a number of tasks. Display 1300 assists the user in performing any of the following: a) initiating a request to identify other potential chat participants; b) updating the user's member profile; or c) removing the user's member profile from comparisons initiated by other users. Button 1302 is a new-match button that performs the same function as button 908 (i.e. causes a request to identify other potential chat participants to be initiated). Button 1304 closes the chat and removes the user's member profile from comparisons initiated by other users (i.e. automatically opts the user out of the match chat feature). Button 1306 helps the user update his or her profile by opening the member profile display 600.

Parental controls may be implemented to give parents control over with whom their children are potentially chatting.

Other implementations may provide a buddy match feature that is more directed to generally making users aware of others who share their interests, and allowing those with shared interests to communicate in a number of ways. As described above, some service providers provide their members with a number of online communication services, such as chat, instant messaging (IM), e-mail, message boards, and member directories. Thus, the chat service may be part of a larger suite of communication services that are offered by the service provider, and a member may encounter and communicate with other members through these other services in addition to the chat service. For instance, the member may encounter one set of members through the use of e-mail, while encountering a different set through the use of message boards. In such an environment, a buddy match feature may indicate those members who share one or more of a particular member's profile attributes as the particular member uses the various services and encounters contact information for those members with shared interests.

In one implementation that enables a buddy match feature in such an environment, the membership profile database is additionally connected to a different or larger set of front-end servers that provide other services. The matching services are performed by the membership profile database, which then notifies the various front-ends of any matches and what attributes and/or interests have matched. The front-ends then use this information to provide indications of the matches to a member as the member uses the other services and encounters screen names, e-mail address, or other contact information of members with whom the member shares an interest.

Other implementations may be used. For example, a copy of the membership database may be included as a part of each system that handles the various services such as e-mail, instant messaging, and message boards, instead of using a single membership database connected to each front-end server. Additionally, or alternatively, a single front-end server may provide the various services.

The process for making users aware of others who share their interests is generally the same as the process described in FIG. 3A. In general, a member (the match recipient) may update or create a member profile. Once the match recipient has a member profile, a search is initiated to identify matching members by comparing the member profile of the match recipient to the member profiles of other members. Matching members are other members whose member profiles have at least one personal attribute matching an attribute of the match recipient's member profile. Then, as the match recipient uses the various services, the match recipient is provided with an indication that matching members have been identified.

Match indications, in this case, may be more or less subtle than display 900 and may directly indicate matching members. For example, the indication may be a visual cue that is displayed when contact information (e.g., a screen name for instant messaging or an e-mail address) of the matching member is displayed to the match recipient. One manner of providing a visual cue includes highlighting or bolding a matching member's screen name or e-mail address when the screen name or e-mail address is displayed to the match recipient. Other manners of indicating a matching member include displaying icons next to the contact information or animating the contact information.

Figure 14A:
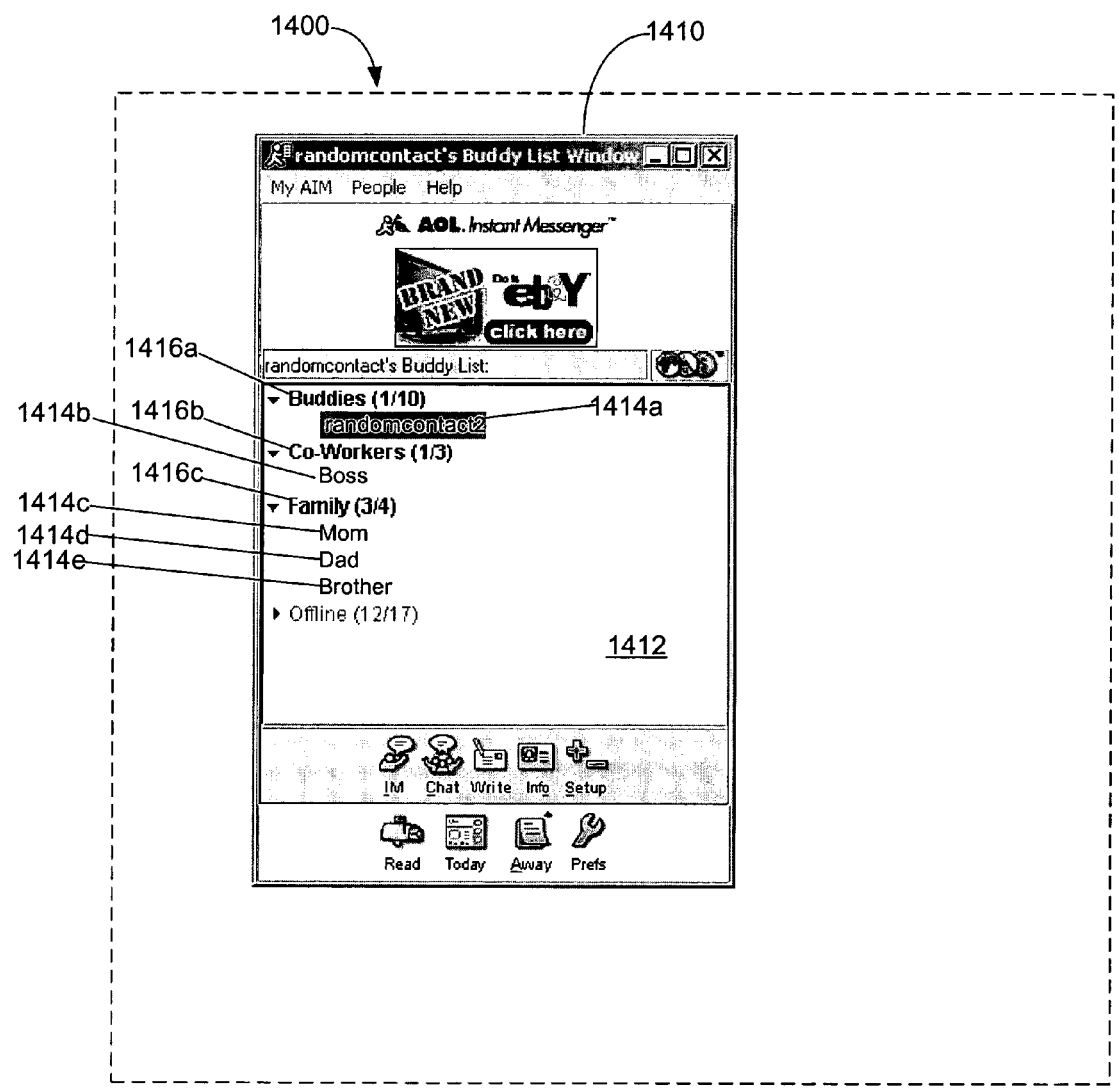
FIGS. 14A and 14B are illustrations showing a computer desktop with a user interface of an instant messaging client program in which the screen names of matching members are highlighted.

As an example of an indication for a matching member, FIG. 14A shows a computer desktop 1400 with a user interface 1410 of an instant messaging client program in which the screen name of matching members are highlighted. Instant messaging client programs typically allow members to communicate in real-time, usually in text form.

User interface 1410 has a box 1412 that displays the screen names 1414*a*-1414*e* of the member's buddies. Buddies are other users of the instant messaging program selected by the member to whom interface 1410 is displayed, randomcontact in this case (as indicated by the title bar of interface 1410). The list of buddies displayed in box 1412 of user interface 1410 typically is referred to as the buddy list. In the buddy list, buddies are grouped together into buddy groups 1416*a*-1416*c*. For example, buddies 1414*c*-1414*e* are displayed under buddy group 1416*c*. When a buddy's IM client program is available to receive communications (i.e., a state commonly referred to as "present"), the screen name of the buddy in the buddy list is displayed or visually distinguished from other buddies not presently available to receive communications or otherwise not having an equivalent state. For example, in the interface shown by FIG. 14A, the buddy whose screen name is "randomcontact2" 1414*a* is part of the Buddies buddy group 1416*a* and, consequently, the screen name 1414*a* is listed under the Buddies buddy group 1416*a*. The randomcontact2 screen name 1414*a*, the Boss screen name 1414*b*, and the screen names Mom, Dad, and Brother 1414*c*-1414*e* all are displayed under their corresponding buddy groups to illustrate their presence and availability to receive communications, which distinguishes these screen names from screen names not shown, but listed under the Offline buddy group. Similarly, the groups having present screen names (e.g., 1416*a*-1416*c*) are visually distinguished from the group(s) not having screen names present, for example, the Offline group. Using the buddy list, a user can select a buddy and initiate real-time communications with the selected buddy.

To indicate that a buddy also is a matching member, the screen name of the buddy is highlighted or otherwise visually distinguished from screen names of non-matching members within interface 1410. As shown in the exemplary interface 1410, the buddy whose screen name is randomcontact is a matching member and the screen name is highlighted accordingly.

Figure 14B:
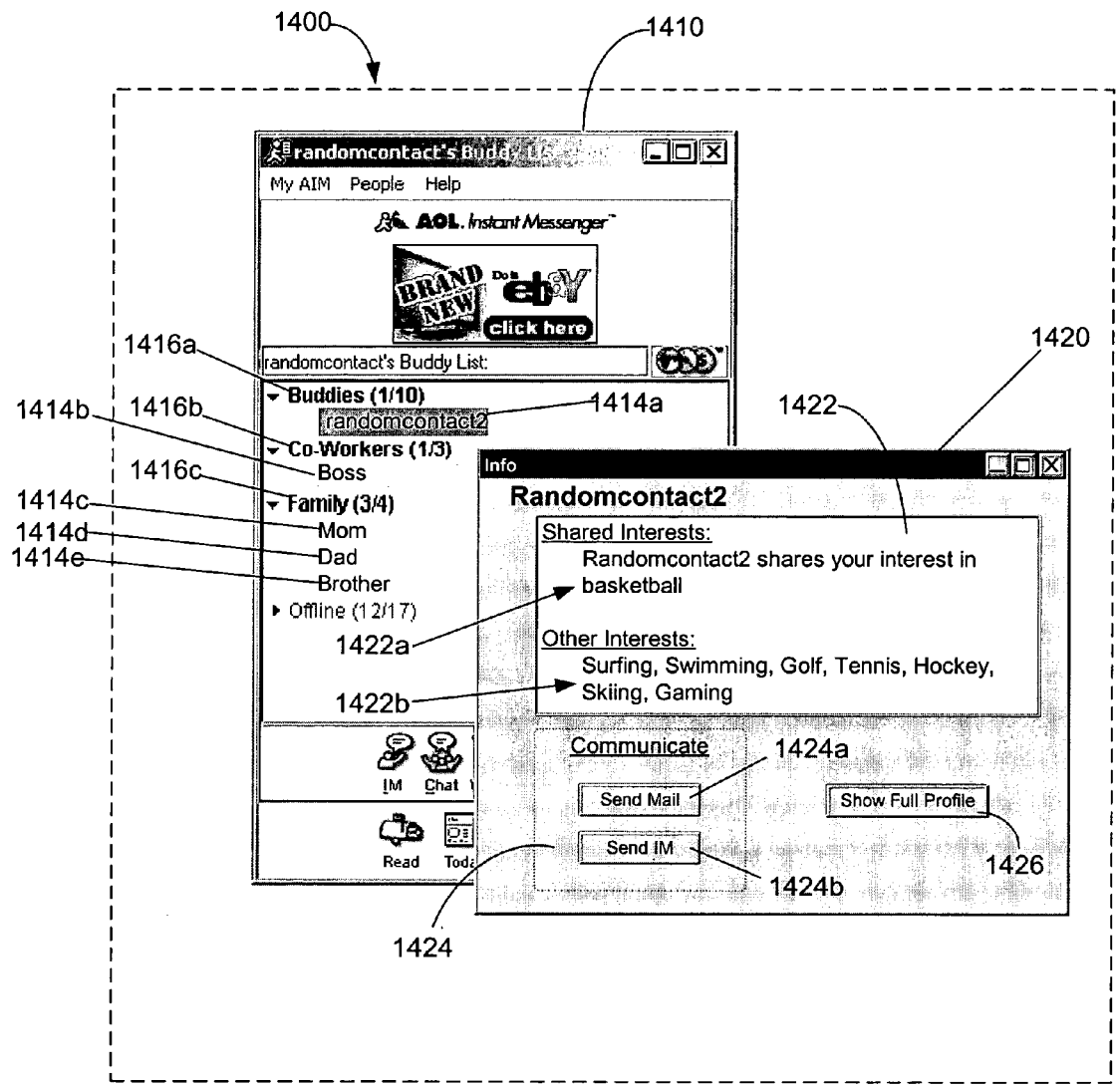

Referring to FIG. 14B, in one implementation, the match recipient may obtain more information about the matching member by performing an action (e.g. using a cursor to select the screen name) that causes a dialog box 1420 to be displayed. Dialog box 1420 provides information about the matching attribute so that the match recipient will know what interest(s) he or she has in common with the matching member. Dialog box 1420 also allows the match recipient to initiate communications with the matching member.

To provide information about the matching attributes, dialog box 1420 includes a list box that displays the shared interests 1422*a* (i.e., the interests that are shared between the match recipient and matching member). In the exemplary dialog box 1420 shown, the list box indicates that randomcontact and randomcontact2 share an interest in basketball. List box 1422 also displays the other interests 1422*b* of the matching member.

To initiate communications with the matching member, dialog box 1420 includes a communication area 1424 that has buttons 1424*a* and 1424*b*. Selecting button 1424*a* initiates an e-mail communication with the matching member, while selecting button 1424*b* initiates an instant message with the matching member.

The member profile of the matching member may be shown by selecting button 1426. The displayed member profile may show some or all of the information described with respect to FIG. 6.

Figure 14C:
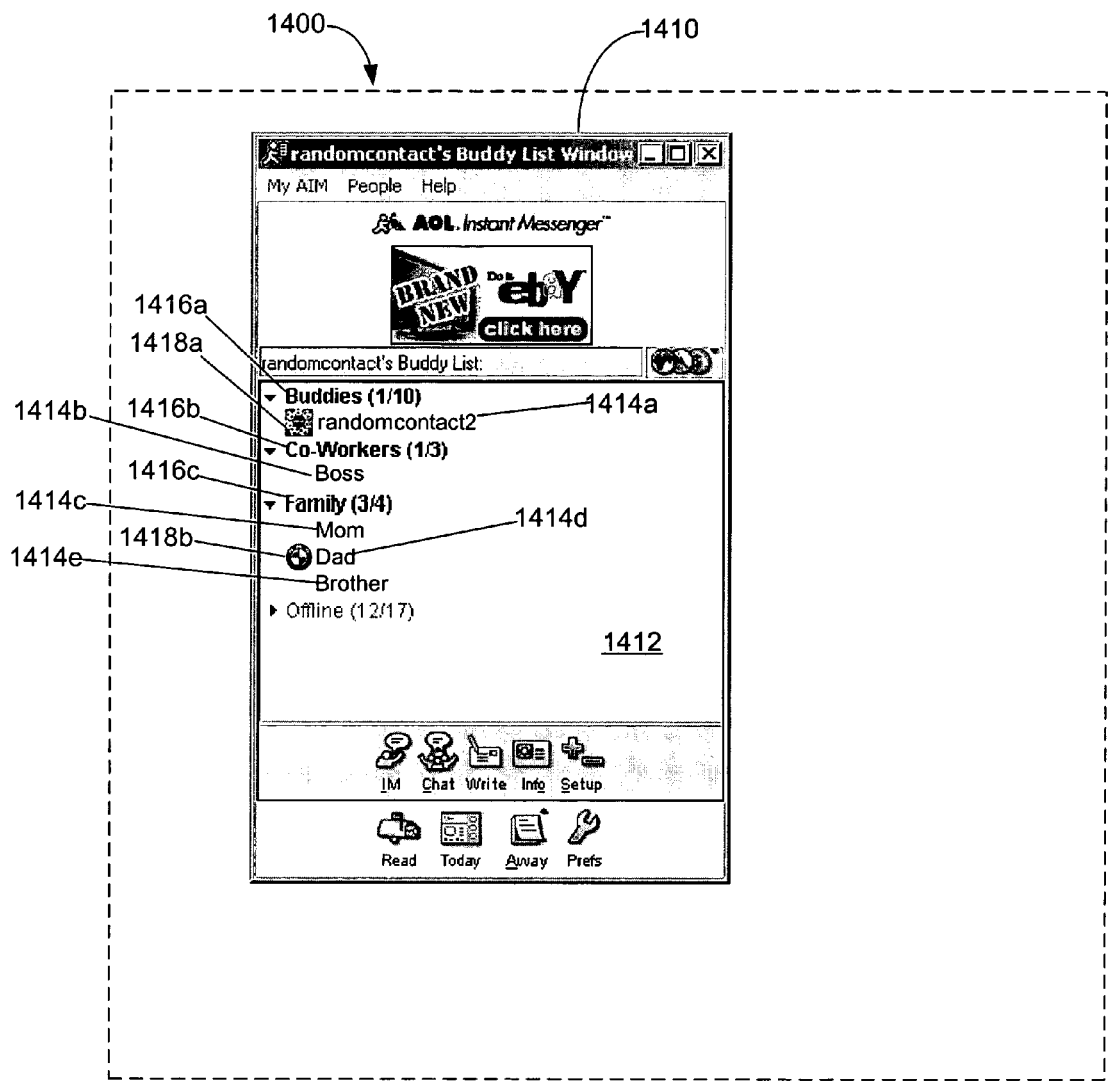
FIG. 14C is an illustration showing another implementation for indicating a matching member in which matching members are indicated by icons displayed next to the matching members' screen names.

Referring to FIG. 14C, in another implementation, matching members are indicated by icons displayed next to the matching members' screen names. As shown, an icon 1418*a* is displayed next to the screen name 1414*a*, indicating that randomcontact2 is a matching member. Likewise, an icon 1418*b* is displayed next to screen name Dad 1414*d*, indicating that Dad also is a matching member. Icons 1418*a* and 1418*b* are different icons and each indicates the particular matching interest or attribute. For instance, icon 1418*a* indicates that randomcontact and randomcontact2 share an interest in soccer, while icon 1418*b* indicates that randomcontact and Dad share an interest in BMW® cars.

More than one icon may be displayed next to the screen name to indicate multiple matching attributes and what those attributes are. In addition, icons can indicate general matching attributes, or be more specific, depending on the matching attribute. For example, if members have matching attributes related to sports, an icon that indicates a general interest in sports may be used, or icons may be used to indicate the specific type of sport, or even a specific sports team. As a more specific example, if randomcontact and randomcontact2 are both interested in football, but each likes separate teams, then an icon indicating a general interest in football may be used. If, on the other hand, randomcontact and randomcontact2 both were fans of the same football team, then an icon indicating the football team may be used to indicate they share an interest in the same team.

Icons also can be placed next to intermediate members to indicate the interests of the corresponding matching member.

Figure 14D:
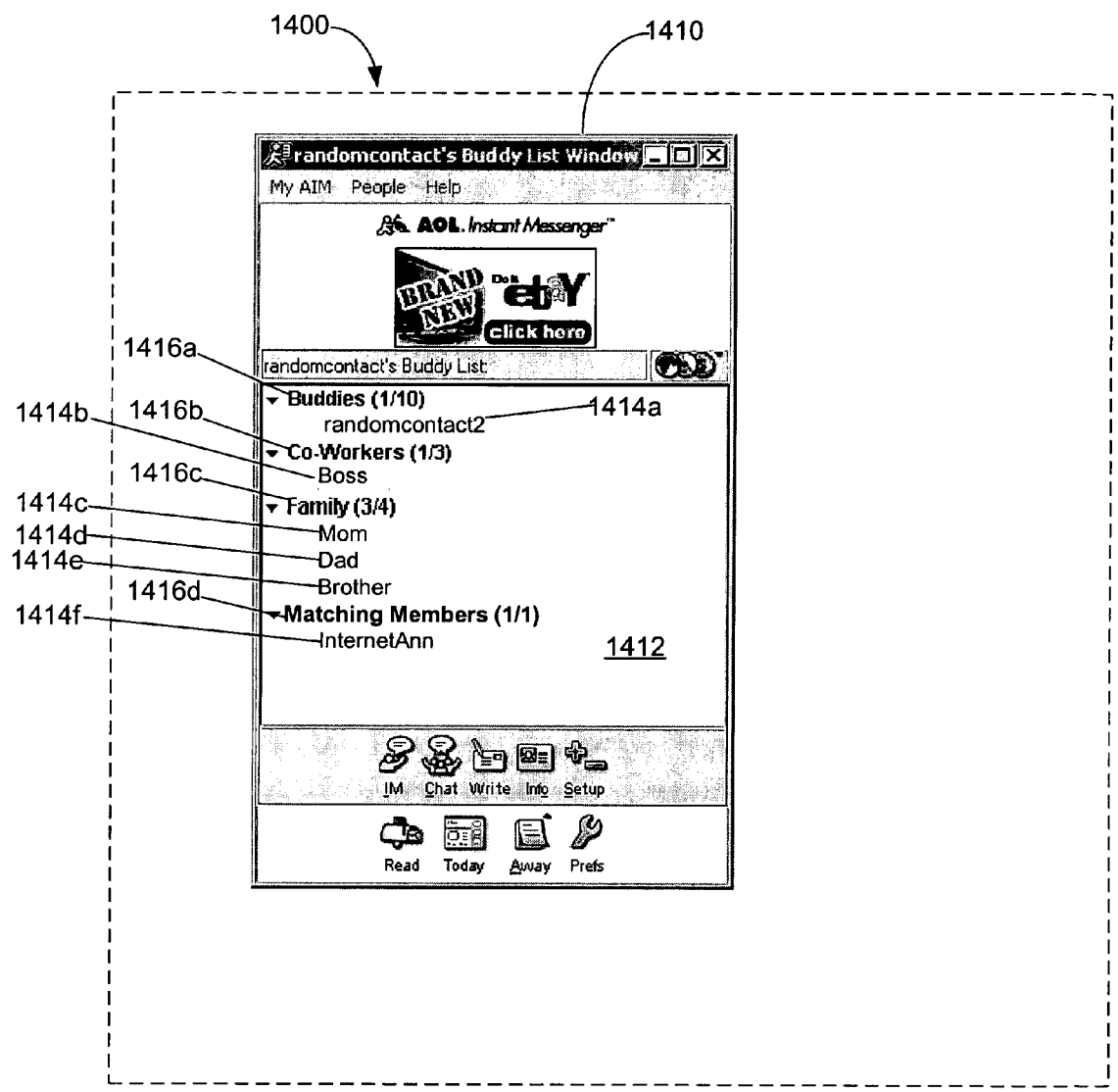
FIG. 14D is an illustration show yet another implementation for indicating matching members in which the buddy list of an instant messaging program interface is modified to include a Matching Members buddy group.

FIG. 14D shows yet another manner of indicating a matching member. In this implementation, the buddy list of an instant messaging program interface 1410 is modified to include a Matching Members buddy group 1416*d*. When a matching member is located, the matching member's screen name is displayed under the Matching Member buddy group 1416*d*. In the example shown, InternetAnn is a matching member and, consequently, the screen name InternetAnn 1414*f* is listed under the Matching Members group 1416*d*. More than one buddy group can be displayed to indicate or visually distinguish members who match different interests or subgroups may be provided for the same person. For example, "Matching Members-Soccer" may be added as a group or subgroup when a matching member is determined based on the attribute soccer.

Figure 15:
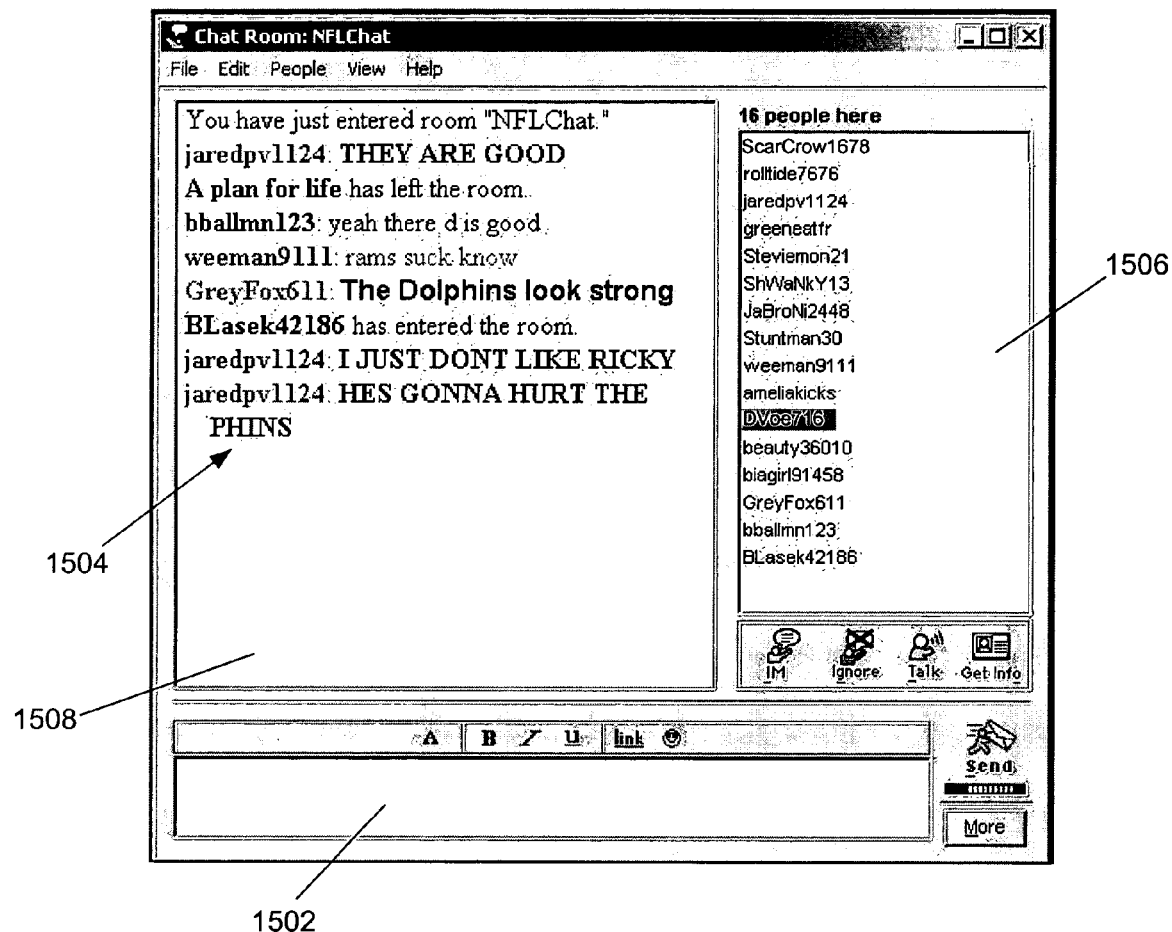
FIG. 15 is an illustration showing an exemplary screen display of a chat room in which a matching member's screen name is indicated by highlighting.

As another example of a service or application in which an indication of a matching member is provided, FIG. 15 is an illustration showing an exemplary screen display 1500 of a chat room in which a matching member's screen name is indicated by highlighting. Screen display 1500 is similar to screen display 200 and includes an edit box 1502 to enter text, a scrolling window 1508 to display the conversation 1504, and a window 1506 in which participating members' screen names are listed. To indicate that a participating member also is a matching member, the screen name of the participating member has a highlight behind the screen name listed in window 1506.

As shown in the exemplary screen display 1500, the member whose screen name is DVoe716 is a matching member and the screen name is highlighted accordingly. As with the display described in FIGS. 14A and 14B, a dialog box (not shown) may be displayed to provide more information about the matching member. The dialog box may be displayed in response to the match recipient performing an action on the indication, such as using a cursor to select the screen name in window 1506.

While specific examples of match indications have been illustrated with respect to instant messaging and chat, in general, a matching member may be indicated in any service in which contact information for the matching member is displayed to the match recipient. When the contact information of a matching member is displayed in a user interface for the communication service, the contact information is accompanied by an indication that the contact information belongs to a matching member. Examples of services other than IM and chat rooms in which match indications may be provided include e-mail and message boards. For e-mail, a display of e-mails in a match recipient's mailbox may indicate e-mail addresses that belong to matching members. A display of e-mail headers also may indicate e-mail addresses that belong to matching members. Indications of matches also may be displayed in a match recipient's address book. For message boards, posts may have indications for screen names belonging to matching members that are included in the posts. Indications of matching members may be pervasive throughout all or most of the provided services in which a match recipient may encounter contact information for the matching member.

The buddy match feature may include a "connected match" feature. A connected match occurs when a match recipient and a matching member are connected by a third member (the intermediary member). An intermediary member connects a match recipient and a matching member when a personal, business, or other relationship exists between the intermediary member and the match recipient and between the intermediary member and the matching member. When a connected match occurs, the intermediary member is indicated to the match recipient. This allows the match recipient to contact the matching member through the intermediary member. Thus, the intermediary member may act as an intermediary that facilitates contact between the match recipient and matching member, particularly when the match recipient and matching member do not have any relationship with one another.

Figure 16:
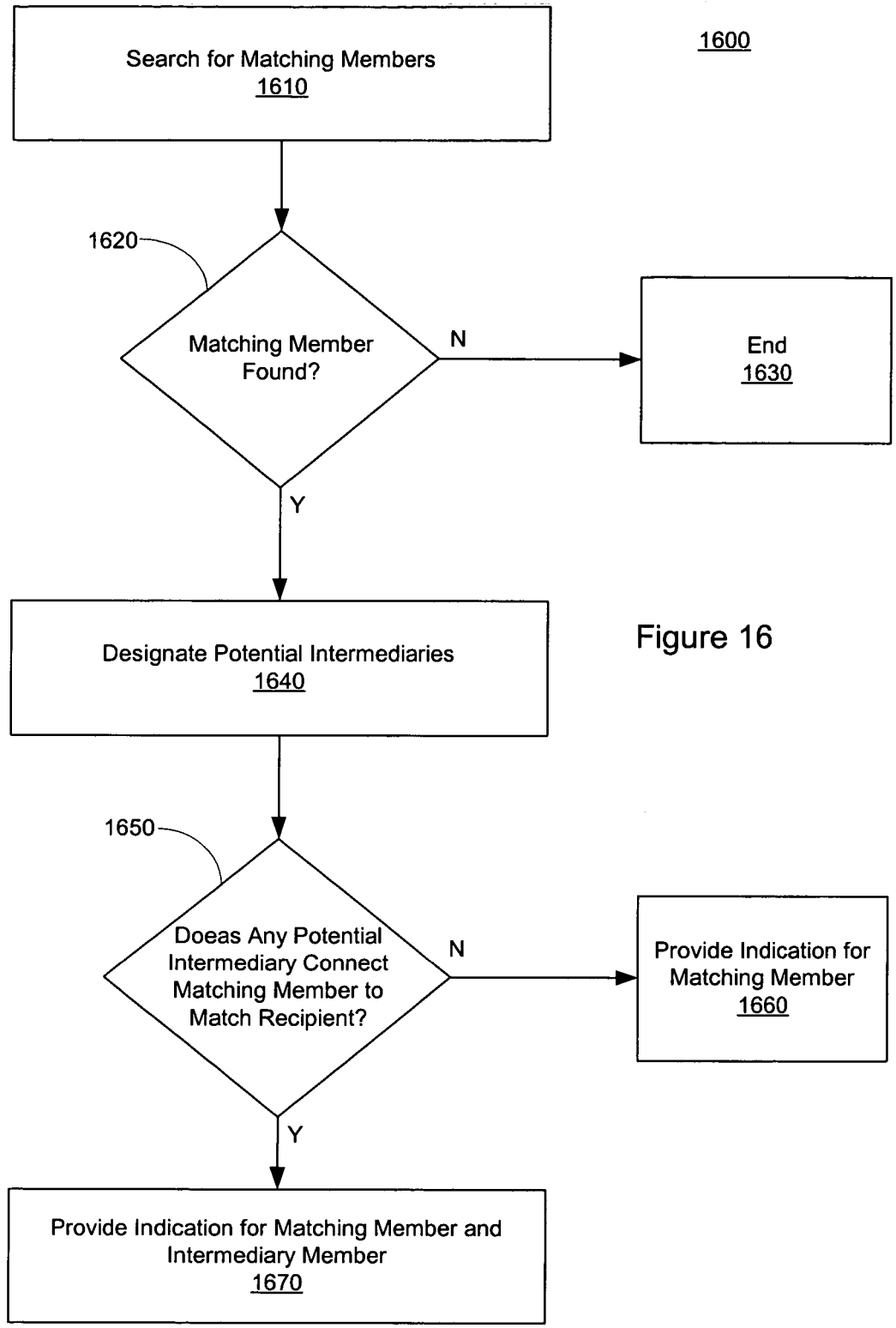
FIG. 16 is a flow chart illustrating a process that implements a connected match feature for a match recipient.

FIG. 16 is a flow chart illustrating a process 1600 that implements the connected match feature for a match recipient. A search for matching members is performed (1605) by comparing the member profile of the match recipient to the member profiles of other members (1605). Matching members are identified if their member profiles have at least one personal attribute matching an attribute of the requesting user's member profile. For example, if the requesting user has indicated golf as a hobby, matching members are those that also have indicated golf as a hobby. Search 1605 may be performed similarly to search 315.

As with search 315, search 1605 may continue for a predefined length of time, or until a predefined number of matches has been found, whichever occurs first. The predefined number of matches may be defined as all matches such that all matching members are identified.

If no matches are found (1610), process 1600 ends (1615). However, if a matching member is identified (1610), then potential intermediary members are determined (1620). Alternatively, potential intermediary members may have been identified previously, for example, before the search was conducted or at the same time as the search.

Potential intermediary members are other members who have a personal, business or other relationship with the match recipient. Whether a member has a relationship with the match recipient may be determined by examining a contact list (e.g., a buddy list or address book) of the match recipient or potential intermediary member. A relationship may be deemed to exist when contact information (e.g., a screen name or e-mail address) of the potential intermediary member is listed in a contact list of the match recipient or vice versa.

In one implementation, potential intermediary members are limited to those members who are listed in a contact list of the match recipient. This may help to insure that any intermediary members will be indicated to the match recipient because a match recipient is likely to view the contact list that includes the intermediary member's contact information.

Next, a determination (1625) is made as to whether any of the potential intermediaries are actual intermediary members, i.e. whether a potential intermediary connects the match recipient to the matching member. A potential intermediary connects the match recipient to the matching member when the potential intermediary member also has a personal, business or other relationship with the matching member. Whether the potential intermediary member has a relationship with the matching member may be determined by examining a contact list (e.g., a buddy list or address book) of the potential intermediary member or the matching member. A relationship may be deemed to exist when contact information (e.g., a screen name or e-mail address) of the matching member is listed in a contact list of the potential intermediary member or vice versa.

If none of the potential intermediary members connect the match recipient and matching member (1625), then an indication is provided only for the matching member (1630), as described above. If any of the potential intermediary members do connect the match recipient and matching member (1625), then an indication is provided for both the matching member and any intermediary members (1635). Alternatively, the indication may be limited to just the intermediary member. The indication for an intermediary member may be similar to that for a matching member. For example, the screen name, e-mail, or other contact information of the intermediary member may be highlighted when displayed. The highlighting may be a different color from the highlighting for a matching member in order to distinguish the two. As with the indication of matching members, indications of intermediary members may be pervasive throughout all or most of the provided services in which a match recipient may encounter contact information for an intermediary member.

Depending on the techniques used to indicate a matching member and an intermediary member, it may not be possible to indicate when a member is both a matching member and an intermediary member. If this is the case, then the indication may be limited to only indicating the matching member status. When the indication is so limited, those members who have a relationship with the match recipient, but who are also matching members of the match recipient, may be excluded as potential intermediary members. In other words, because only a member's status as a matching member is going to be displayed, regardless of whether the member is an intermediary member or not, the member does not need to be checked to determine whether the member is an intermediary member.

Also, in process 1600, intermediary members are determined sequentially after matching members. However, other implementations may have intermediary members being identified in parallel with matching members.

Figure 17:
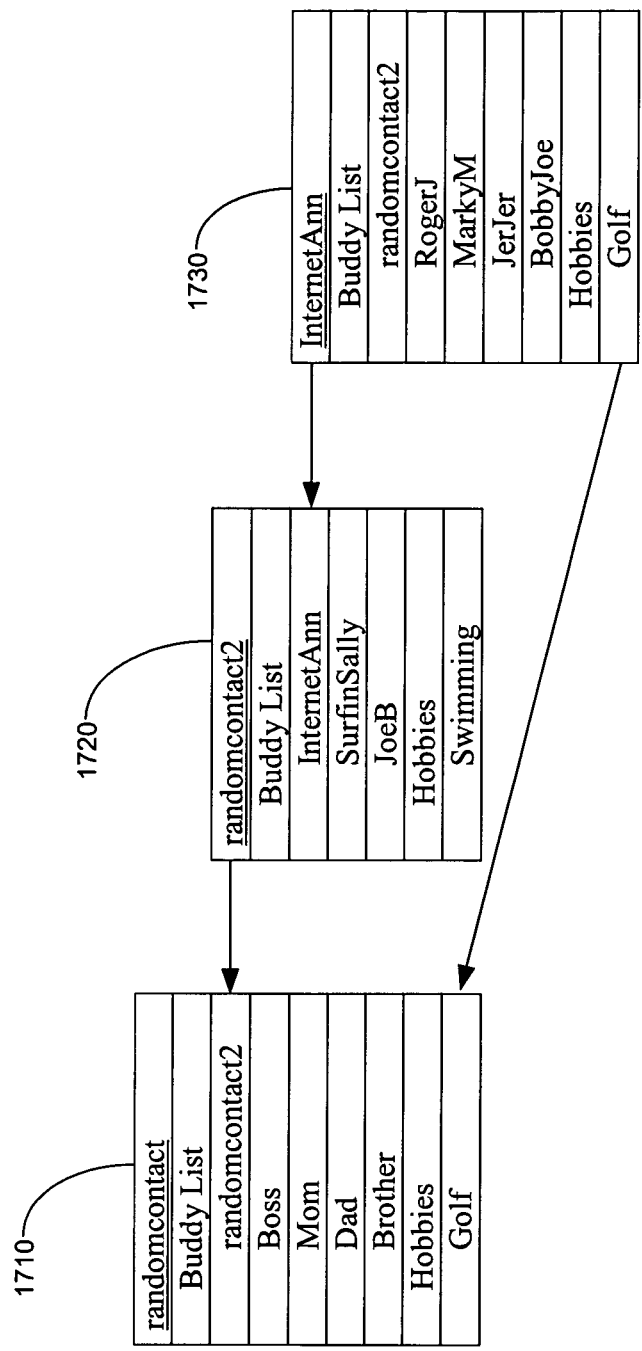
FIG. 17 is an illustration showing an exemplary relationship between a match recipient, an intermediary member, and a matching member.
Figure 18A:
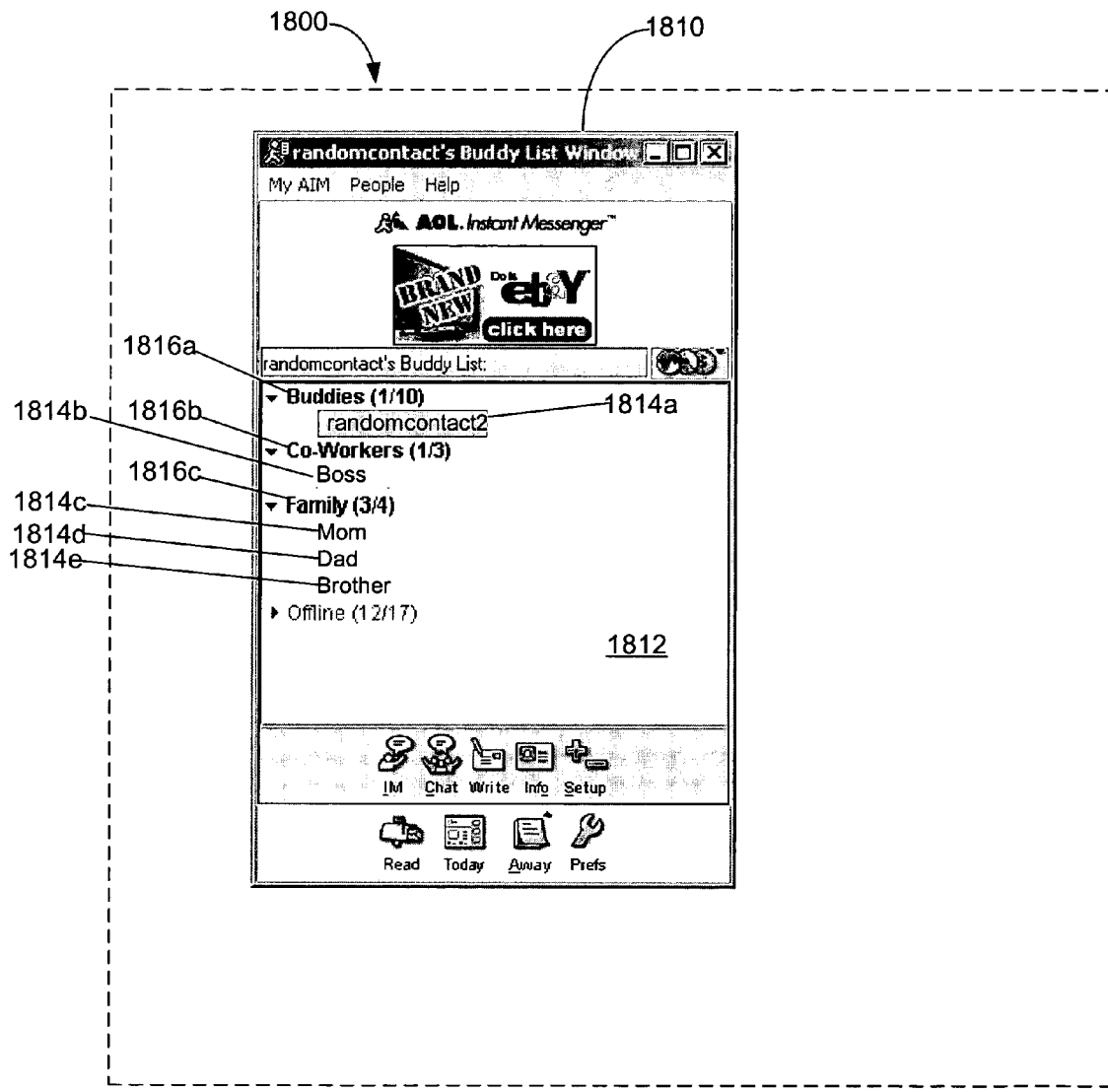
FIGS. 18A and 18B are illustrations showing a computer desktop with a user interface of an instant messaging client program in which the screen name of intermediary members are highlighted.
Figure 18B:
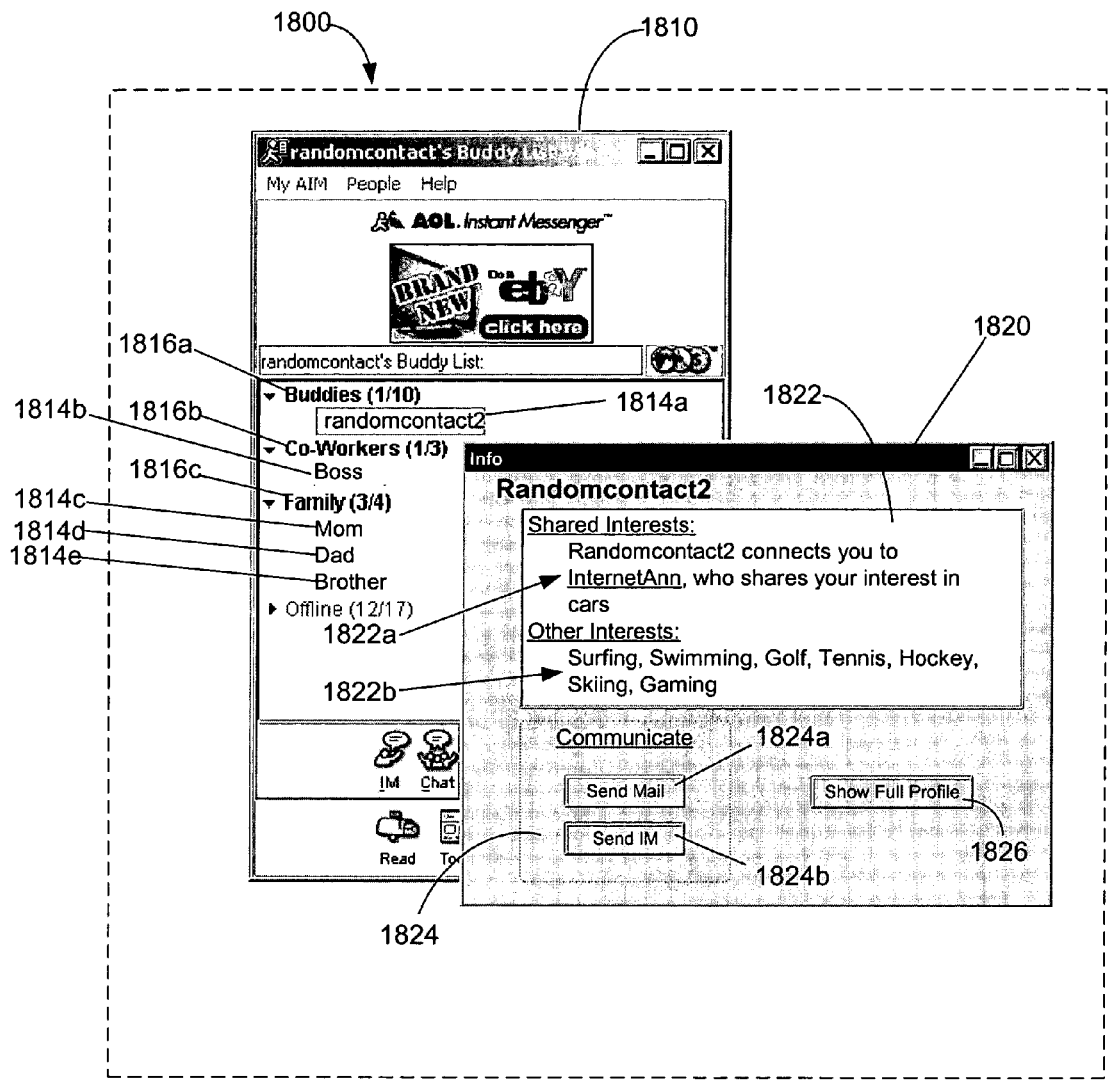

FIG. 17 is an illustration showing an exemplary relationship between a match recipient, an intermediary member, and a matching member, while FIGS. 18A and 18B show an example of a corresponding indication of the intermediary member to the match recipient. Referring to FIG. 17, a match recipient 1710 has a screen name "randomcontact" and shares golf as a hobby with a matching member 1730, whose screen name is InternetAnn. An intermediary member 1720, whose screen name is randomcontact2, is on randomcontact's buddy list. InternetAnn is on randomcontact2's buddy list.

FIG. 18A is an illustration showing a computer desktop 1800 with a user interface 1810 of an instant messaging client program in which the screen name of intermediary members are highlighted. The instant messaging client program is being used by randomcontact. A search was performed to determine matching members for randomcontact. The search resulted in InternetAnn being identified as a matching member because she shares golf as a hobby with randomcontact.

After InternetAnn was identified as a matching member, randomcontact2 was identified as a potential intermediary member because randomcontact2 is on randomcontact's buddy list. Randomcontact2's buddy list was then checked to determine if InternetAnn was on the buddy list. Because InternetAnn was on randomcontact's buddy list, randomcontact2 is designated as an intermediary member.

To indicate that randomcontact2 is an intermediary member, the screen name 1814a (i.e., randomcontact2) has an highlight. Referring to FIG. 18B, randomcontact may obtain more information about why randomcontact2 has been identified as an intermediary member by performing an action (e.g. using a cursor to select the screen name) that causes a dialog box 1820 to be displayed. Dialog box 1820 is similar to dialog box 1420. Dialog box 1820 displays randomcontact2's interests 1822b, allows randomcontact to initiate communications with randomcontact using buttons 1824a and 1824b, and provides a button 1826 to display the member profile of randomcontact2.

Under the shared interests 1822a, however, dialog box 1820 indicates that randomcontact2 connects randomcontact to InternetAnn because InternetAnn shares an interest with randomcontact. The screen name InternetAnn in the shared interests 1822a is link to a dialog box (not shown), which is similar to dialog box 1820 except that the dialog box shows the shared interests between InternetAnn and randomcontact, shows InternetAnn's other interests, and allows randomcontact to initiate communications with InternetAnn, rather than randomcontact2. Selecting InternetAnn's screen name in dialog box 1820 invokes the linked dialog box.

Figure 18C:
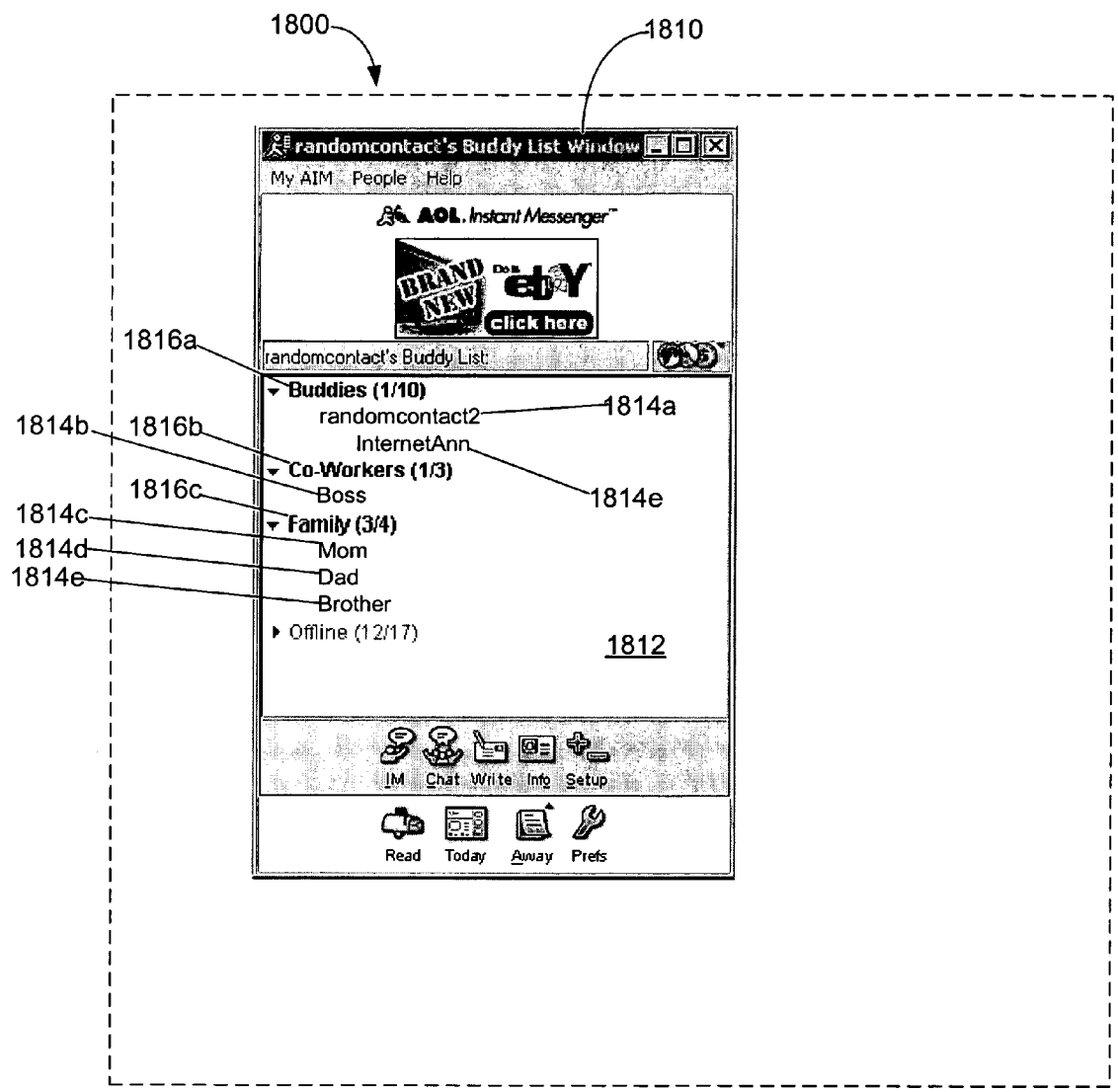
FIG. 18C is an illustration showing an alternate manner of displaying an indication of an intermediary member that includes modifying the buddy list of an instant messaging program interface to show a tree structure of matching members and the intermediary members.

Referring to FIG. 18C, an alternate manner of displaying an indication of an intermediary member includes modifying the buddy list to show a tree structure of matching members and the intermediary members. As with the example illustrated in FIGS. 18a and 18B, the instant messaging client program in FIG. 18C is being used by randomcontact. A search was performed to determine matching members for randomcontact. The search resulted in InternetAnn being identified as a matching member and randomcontact2 as an intermediary member.

To indicate the matching member and intermediary member relationships, the screen names randomcontact2 1814a and InternetAnn 1814e are displayed in a tree structure under the Buddy group 1816a. The tree structure is created by displaying the randomcontact2 screen name 1814a indented under the Buddy group 1816a and the InternetAnn screen name 1814e indented under the randomcontact2 screen name 1814a. This structure indicates that randomcontact2 is an intermediary member who connects randomcontact to the matching member, InternetAnn. A user can initiate an instant messaging session with either randomcontact2 or InternetAnn, for example, by selecting the respective screen name.

Figure 19:
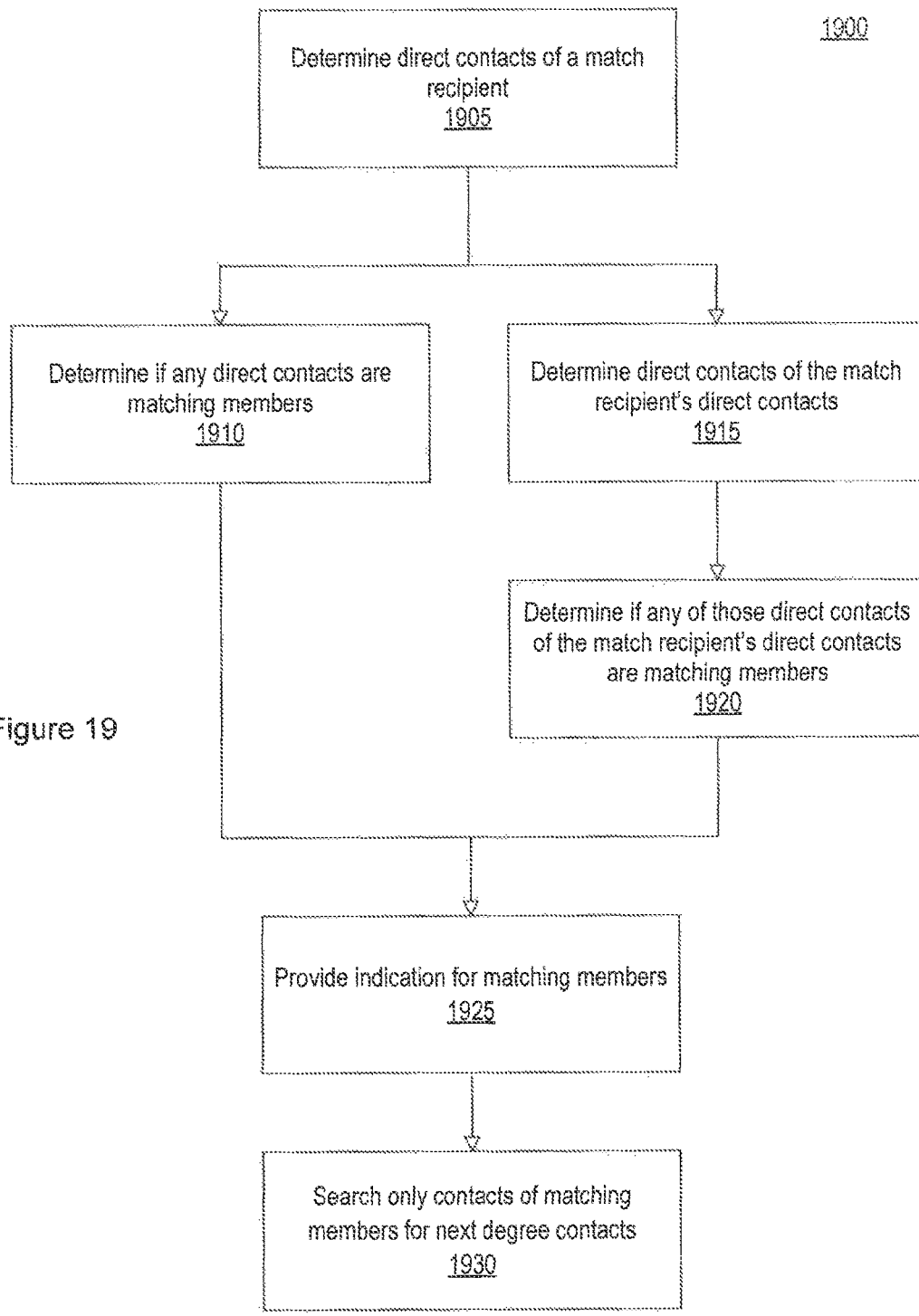
FIG. 19 is a flow chart showing an alternate process for determining matching members.

FIG. 19 is a flow chart showing an alternate process 1900 for determining matching members. One or more contact lists of a user are accessed to determine direct contacts of the match recipient (referred to as zero degree contacts) (1905). The member profiles of the zero degree contacts are compared to the member profile of the match recipient to determine if any of the direct contacts are matching members (1910). At the same time (or before or after) the determination (1910) is made, one or more contact lists of the zero degree contacts are accessed to determine direct contacts of the zero degree contacts (referred to as first degree contacts) (1915). The member profiles of the first degree contacts are compared to the member profile of the match recipient to determine if any of the first degree contacts are matching members (1920). An indication then is provided for any matching members located (1925).

Process 1900 can be expanded to search up to the Nth degree contacts for matching members. That is, the direct contacts of the first degree contacts (the second degree contacts) can be determined and searched, along with the third degree contacts, etc, up to the N degree contacts. In addition, process 1900 may keep track of the intermediary members and an indication of any intermediary members also may be provided. Further, process 1900 may be modified such that only contacts of matching members are searched for the next degree contacts (1930). For example, only the contact lists of matching members in the zero degree contacts are accessed to determine first degree contacts.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

Other implementations are within the scope of the following claims.

What is claimed is:

1. A method of identifying one or more matching members of an online communication service for a match recipient, the method comprising the following operations performed by at least one processor:
   maintaining a member profile for the match recipient, the member profile including at least one personal attribute of the match recipient;
   accessing a contacts list maintained for the match recipient, the contacts list of the match recipient including direct contacts of the match recipient;
   identifying matching members for the match recipient, the identification of matching members comprising:
      analyzing the accessed contacts list of the match recipient to identify one or more entities from the direct contacts of the match recipient whose member profiles share at least one personal attribute with the match recipient; and
      identify one or more additional entities as matching members for the match recipient by analyzing contacts lists of the identified direct contacts to successively identify entities that share at least one personal attribute with the match recipient;
   forming a group of matching members comprising at least the identified one or more entities and the identified on or more additional entities who are currently online;
   causing an identifier for the matching members of the group to be displayed to the match recipient in a user interface for the online communication service; and
   displaying information representing the at least one personal attribute shared by each of the matching members and the match recipient.

2. The method of claim 1, wherein causing the identifier for the matching members to be displayed to the match recipient in the user interface for the online communication service comprises causing a screen name for each of the matching members to be displayed to the match recipient.

3. The method of claim 2 wherein causing the screen name for each of the matching members to be displayed in the user interface for the online communication service comprises causing the screen name for each of the matching members to be displayed in a buddy list of an instant messaging client.

4. The method of claim 3 further comprising causing the displayed screen name for each of the matching members to be accompanied by an indication that the displayed screen names belong to the matching members by including a colored highlight to be displayed behind the displayed screen names.

5. The method of claim 2 wherein causing the screen name for each of the matching members to be displayed in the user interface for the online communication service comprises causing the screen name for each of the matching members to be displayed on a message board.

6. The method of claim 5 further comprising causing the displayed screen name for each of the matching members to be accompanied by an indication that the displayed screen names belong to the matching members by including a colored highlight to be displayed behind the displayed screen names.

7. The method of claim 2 wherein causing the screen name for the matching member to be displayed in the user interface for the online communication service comprises causing the screen name to be displayed in a chat room.

8. The method of claim 1 wherein causing the identifier for the matching members to be displayed to the match recipient in the user interface for the online communication service comprises causing an e-mail address for each of the matching members to be displayed to the match recipient.

9. The method of claim 8 wherein causing the e-mail address for each of the matching members to be displayed in the user interface of the online communication service comprises causing the e-mail addresses to be displayed in an e-mail mailbox of the match recipient.

10. The method of claim 9 wherein causing the displayed e-mail addresses for the matching members to be accompanied by an indication that the displayed e-mail addresses belong to the matching members comprises causing a colored highlight to be displayed behind the displayed e-mail addresses.

11. The method of claim 8 wherein causing the e-mail addresses for the matching members to be displayed in the user interface of the online communication service comprises causing the e-mail addresses to be displayed in at least one e-mail header displayed to the match recipient.

12. The method of claim 11 wherein causing the displayed e-mail addresses for the matching members to be accompanied by an indication that the displayed e-mail addresses belong to the matching members comprises causing a colored highlight to be displayed behind the displayed e-mail addresses.

13. The method of claim 1 wherein maintaining a member profile for the match recipient that includes at least one personal attribute comprises maintaining the member profile for the match recipient that includes at least a hobbies attribute.

14. The method of claim 1 further comprising:
identifying intermediary members, wherein the intermediary members comprise entities that connect the match recipient to the matching members; and
causing an identifier for each intermediary member to be displayed to the match recipient along with an indication of contact information belonging to each intermediary member.

15. The method of claim 14 wherein identifying intermediary members comprises:
identifying entities whose contact information is in the contacts list of the match recipient;
determining whether contact information of the matching members is in a contacts list of the identified entities; and
designating entities from the identified entities as an intermediary member when the matching members's contact information is in the contacts list of the identified entities.

16. The method of claim 1 wherein identifying one or more additional entities as matching members for the match recipient is performed until a predetermined number of matching members are found.

17. A non-transitory computer-usable medium storing a computer program for identifying one or more matching members of an online communication service for a match recipient, the computer program comprising instructions for causing at least one processor to:
maintain a member profile for the match recipient, the member profile including at least one personal attribute of the match recipient;
access a contacts list maintained for the match recipient, the contacts list of he match recipient including direct contacts of the match recipient; identify matching members for the match recipient, the identification of matching members comprising:
analyzing the accessed contacts list of the match recipient to identify one or more entities from the direct contacts of the match recipient whose member profiles share at least one personal attribute with the match recipient; and
identifying one or more additional entities as matching members for the match recipient by analyzing contacts lists of the identified direct contacts to successively identify entities that share at least one personal attribute with the match recipient;
form a group of matching members comprising at least the identified one or more entities and the identified one or more additional entities who are currently online;
cause an identifier for the matching members of the group to be displayed to the match recipient in a user interface for the online communication service; and
display information representing the at least one personal attribute shared by each of the matching members and the match recipient.

18. The medium of claim 17 wherein the identifier comprises a screen name for each of the matching members.

19. The medium of claim 18 wherein, to cause the screen name for each of the matching members to be displayed in the user interface for the online communication service, the computer program further comprises instructions for causing the at least one processor to cause the screen names to be displayed in a buddy list of an instant messaging client.

20. The medium of claim 19 wherein the computer program further comprises instructions for causing the at least one processor to:
cause the displayed identifier for each of the matching members to be accompanied by an indication that each displayed identifier belongs to one a the matching members, and
wherein the indication comprises a colored highlight displayed behind each of the displayed, screen names.

21. The medium of claim 18 wherein, to cause the screen name for each of the matching members to be displayed in the user interface for the online communication service, the computer program further comprises instructions for causing the at least one processor to cause the screen names to be displayed on a message board.

22. The medium of claim 21, wherein the computer program further comprises instructions for causing the at least one processor to:
cause the displayed identifier for each of the matching members to be accompanied by an indication that the displayed identifier belongs to one of the matching member, and
wherein the indication comprises a colored highlight displayed behind the displayed screen names.

23. The medium of claim 17 wherein the identifier comprises an e-mail address.

24. The medium of claim 23 wherein, to cause the e-mail address for each of the matching members to be displayed in the user interface of the online communication service, the computer program further comprises instructions for causing the at least one processor to cause the e-mail addresses to be displayed in an e-mail mailbox of the match recipient.

25. The medium of claim 24, wherein the computer program further comprises instructions for causing the at least one processor to:
cause the displayed identifier for each of the matching members to be accompanied by an indication that the displayed identifier belongs to a matching member, and
wherein the indication comprises a colored highlight displayed behind the displayed e-mail addresses.

26. The medium of claim 23 wherein, to cause the e-mail address for each of the matching members to be displayed in the user interface of the online communication service, the computer program further comprises instructions for causing the at least one processor to cause the e-mail addresses to be displayed in at least one e-mail header displayed to the match recipient.

27. The medium method of claim 26, wherein the computer program further comprises instructions for causing the at least one processor to:
cause the displayed identifier for each of the matching members to be accompanied by an indication that the displayed identifier belongs to one of the matching members, and
wherein the indication comprises a colored highlight displayed behind the displayed e-mail addresses.

28. The medium of claim 17 wherein the at least one personal attribute comprises hobbies.

29. The medium of claim 17, wherein the computer program further comprises instructions for causing the at least one processor to:

identify intermediary members, wherein the intermediary members comprise entities that connect the match recipient to the matching members; and cause an identifier for each intermediary member to be displayed to the match recipient along with an indication of contact information belonging to each intermediary member.

30. The medium of claim 29 wherein, to identify the intermediary members, the computer program further comprises instructions for causing the at least one processor to:

identify entities whose contact information is in the contacts list of the match recipient;

determine whether contact information of the matching members is in a contacts list of the identified entities; and designate entities from the identified entities as an intermediary member when the matching members's contact information is in the contacts list of the entity.

31. The medium of claim 17 wherein identifying one or more additional entities as matching members for the match recipient is performed until a predetermined number of matching members are found.

\* \* \* \* \*